United States Patent [19]

Tsuchino et al.

[11] Patent Number: 4,769,549

[45] Date of Patent: Sep. 6, 1988

[54] RADIATION IMAGE STORAGE PANEL AND PROCESS FOR MAKING THE SAME

[75] Inventors: Hisanori Tsuchino; Akiko Kano; Koji Amitani; Fumio Shimada, all of Hino, Japan

[73] Assignee: Konishiroku Photo Industry Co., Ltd., Tokyo, Japan

[21] Appl. No.: 65,150

[22] Filed: Jun. 12, 1987

Related U.S. Application Data

[63] Continuation-in-part of Ser. No. 808,437, Dec. 12, 1985.

[30] Foreign Application Priority Data

| | | | |
|---|---|---|---|
| Dec. 17, 1984 | [JP] | Japan | 59-266912 |
| Dec. 17, 1984 | [JP] | Japan | 59-266913 |
| Dec. 17, 1984 | [JP] | Japan | 59-266914 |
| Dec. 17, 1984 | [JP] | Japan | 59-266915 |
| Dec. 17, 1984 | [JP] | Japan | 59-266916 |

[51] Int. Cl.$^4$ .......................... G01T 1/161; B05D 5/00; G03C 5/17; G03B 42/02

[52] U.S. Cl. .............................. 250/484.1; 250/486.1; 430/139

[58] Field of Search ............... 250/327.2, 484.1, 486.1; 427/65; 430/139

[56] References Cited

U.S. PATENT DOCUMENTS

| | | | |
|---|---|---|---|
| 3,859,527 | 1/1975 | Luckey | 250/327.2 |
| 4,011,454 | 3/1977 | Lubowski et al. | 250/483.1 |
| 4,209,705 | 6/1980 | Washida et al. | 250/486.1 |
| 4,236,078 | 11/1980 | Kotera et al. | 250/363 R |
| 4,287,230 | 9/1981 | Galves et al. | 427/65 |
| 4,350,893 | 9/1982 | Takahashi et al. | 250/484.1 |

FOREIGN PATENT DOCUMENTS

| | | | |
|---|---|---|---|
| 126564 | 11/1984 | European Pat. Off. | 250/484.1 |

*Primary Examiner*—Janice A. Howell
*Assistant Examiner*—Constantine Hannaher
*Attorney, Agent, or Firm*—Frishauf, Holtz, Goodman & Woodward

[57] ABSTRACT

There are disclosed a radiation image storage panel which comprises a stimulable phosphor layer on a support, wherein the stimulable phosphor layer has a fine pillar-shaped block structure, and a process of making a radiation image storage panel having a stimulable phosphor layer on a support, which comprises getting the stimulable phosphor layer having a fine pillar-shaped block structure. Scattering of the stimulation exciting light within the stimulable phosphor layer of the present invention can be markedly reduced since the stimulable phosphor layer has a block structure shaped in fine pillars, whereby it is possible to improve sharpness of the image. Also, radiation sensitivity and graininess of the image can be improved by enlargement of the stimulable phosphor layer without lowering sharpness of the image since lowering in sharpness of the image due to increase of the stimulable phosphor layer is little.

11 Claims, 11 Drawing Sheets

RADIATION IMAGE STORAGE PANEL AND PROCESS FOR MAKING THE SAME

This application is a continuation-in-part, of application Ser. No. 808,437, filed Dec. 12, 1985.

BACKGROUND OF THE INVENTION

This invention relates to a radiation image storage panel by use of a stimulable phosphor and a process for making the same, more particularly to a radiation image storage panel which can give a radiation image of high sharpness and a process for making the same.

A radiation image such as X-ray image is frequently used in diagnosis of diseases, etc. For obtaining such an X-ray image, the so-called radiation photograph is utilized, which is obtained by irradiating X-ray transmitted through a subject on a phosphor layer (fluorescent screen) to thereby generating a visible light, which visible light is then irradiated on a film employing a silver salt similarly as in conventional photographing, followed by development. However, in recent years, methods for taking out images directly from the phosphor layer without use of a film coated with a silver salt have been devised.

As such a method, there is the method for imaging in which a radiation transmitted through a subject is absorbed onto a phosphor, then the phosphor is excited with, for example, light or heat energy to thereby permit the radiation energy accumulated in this phosphor by the above absorption to be radiated as fluorescence, which fluorescence is detected. Specifically, for example, U.S. Pat. No. 3,859,527 and Japanese Provisional Patent Publication No. 12144/1980 discloses a radiation image storage method employing visible light or IR-ray as the stimulating excitation light. This method employs a radiation image storage panel having a stimulable phosphor layer formed on a support. By irradiating the stimulable phosphor layer in this radiation image storage panel with the radiation transmitted through a subject, the radiation image corresponding to the radiation transmission degrees at respective portions of the subject to form a latent image and thereafter the stimulable phosphor layer is scanned with a stimulating excitation light to thereby radiating the radiation energy accumulated for the respective portions, which is converted to light to obtain an image according to the optical signals depending on the intensity of the light. The final image may be reproduced as a hard copy or reproduced on CRT.

Now, the radiation image storage panel having a stimulable phosphor layer to be used for the radiation image storage method is demanded to be high in radiation absorption and light conversion (hereinafter referred to as "radiation sensitivity" as inclusive of both) as a matter of course, good in graininess of the image and yet high in sharpness.

Whereas, radiation image storage panels having stimulable phosphor layers are generally made by applying and drying a dispersion containing a stimulable phosphor in grains of about 1 to 30 $\mu m$ grain sizes and an organic binder, and therefore low in filling density of the stimulable phosphor (filling percentage 50%). Accordingly, in order to make the radiation sensitivity sufficiently high, it is necessary to make the layer thickness of the stimulable phosphor layer thick as shown in FIG. 12(*a*), line (b).

As apparently seen from the same Figure, the amount of the stimulable phosphor attached is 50 mg/cm$^2$ when the layer thickness of the stimulable phosphor layer is 200 $\mu m$, and the radiation sensitivity is increased linearly until saturated at 450 $\mu m$ or more. In this regard, the radiation sensitivity is saturated, because stimulated emission within the stimulable phosphor layer will not come out due to scattering of the stimulable phosphor layer between the stimulable phosphor grains, if the stimulable phosphor layer becomes too thick.

On the other hand, sharpness of the image in the above radiation image storage method tends to become higher as the layer thickness of the stimulable phosphor layer in the radiatio-n image storage panel is thinner, as shown in FIG. 13(*b*), line (b), and therefore it is necessary to make the stimulable phosphor layer thinner for improvement of sharpness.

Also, since the graininess of the image in the above radiation image storage method is determined by the regional fluctuation in radiation quantum number (quantum mottle) or structural disturbance (structural mottle) of the stimulable phosphor layer of the radiation image storage panel, if the layer thickness of the stimulable phosphor layer becomes thin, the radiation quantum number absorbed by the stimulable phosphor layer may be reduced to increase quantum mottle or the structural disturbance may be actualized to increase structural mottle, thereby causing lowering in image quality. Hence, for improvement of graininess of the image, the layer thickness of the stimulable phosphor is required to be thick.

Thus, as described above, the radiation image storage panel of the prior art exhibits tendency for sensitivity to radiation and graininess of image entirely opposite to that for sharpness of the image in relation to the layer thickness of the layer thickness of the phosphor layer, and therefore the above radiation image storage panel has been made at the sacrifice of sensitivity to radiation, graininess and sharpness to some extent.

Whereas, sharpness of the image in the radiation photographic method of the prior art is determined by expansion of the momentary emission (emission on irradiation of radiation) of the phosphor in the fluorescent screen, as is well known in the art. In contrast, sharpness of the image in the radiation image storage method utilizing a stimulable phosphor as described above is not determined by the expansion of the stimulated emission of the stimulable phosphor in the radiation image storage panel, namely by the expansion of the emission of the phosphor as in the radiation photographic method, but determined depending on the expansion of the stimulating excitation light within said panel. For, in this radiation image storage method, since the radiation image information accumulated in the radiation image storage panel is taken out as arranged in a time series, the stimulated emission by the stimulating excitation light irradiated at a certain time (ti) is desirably all collected and recorded as the output from a certain picture element (xi,yi) on said panel on which the stimulating excitation light is irradiated at that time, and therefore, if the stimulating excitation light is expanded by scattering, etc. within said panel and also excites the stimulable phosphor existing outside of the irradiated picture element (xi,yi), then the output from wider region than the picture element is recorded as the output from the above picture element of (xi,yi). Thus, provided that the stimulated emission by the stimulating excitation light irradiated at a certain time (ti) is only the emission from the picture element (xi,yi) on said panel on which the stimulating excitation light is truly irradiated at that time (ti), there is no influence on sharpness of the image obtained even if the emission may have any expansion.

In the state of the art as described above, some methods for improving sharpness of the radiation image have been invented. For example, there are the method in which white powder is mixed into the stimulable phosphor layer in the radiation image storage panel as disclosed in Japanese Provisional Patent Publication No. 146447/1980; the method in which the radiation image storage panel is colored so that the average reflectance in the stimulating excitation wavelength region of the stimulable phosphor is made smaller than the average reflectance in the stimulated emission wavelength region of the above stimulable phosphor, etc. However, these methods will necessarily lower markedly sensitivity, if sharpness is improved, and therefore cannot be said to be preferable methods.

On the other hand, as contrasted to these methods, the present applicant has already proposed in Japanese Patent Application No. 196365/1984 a radiation image storage panel in which the stimulable phosphor layer contains no binder as a novel radiation image storage panel which has improved the drawbacks of the prior art in the radiation image storage panel employing a stimulable phosphor as described above. According to this proposal, since the stimulable phosphor layer in the radiation storage panel contains no binder, filling percentage of the stimulable phosphor can be improved simultaneously with improvement of inclination of the stimulable excitation light and the stimulable emission, whereby sensitivity of the above radiation image storage panel to radiation and graininess of the image can be improved simultaneously with improvement of sharpness of the image.

However, in the above radiation image storage method, demand for image quality excellent in sharpness without damaging sensitivity and graininess is becoming more rigorous.

SUMMARY OF THE INVENTION

The present invention relates to the radiation image storage panel according to the above proposal by use of a stimulable phosphor, improves further this panel and an object of the present invention is to provide a radiation image storage panel which improves sensitivity to radiation and also gives an image of high sharpness.

Another object of the present invention is to provide a radiation image storage panel which improves graininess and also gives an image of high sharpness.

Still another object of the present invention along with the above objects is to provide a process for making a radiation image storage panel satisfying the above objects.

The above objects of the present invention can be accomplished by a radiation image storage pasnel having a stimulable phosphor layer on a support, wherein said stimulable phosphor layer has a fine pillar-shaped block structure, which may preferably extend substantially perpendicularly to said support, and a process for making the same.

BRIEF DESCRIPTION OF THE DRAWINGS

FIG. 12(*b*) is a graph showing the relationship of the layer thickness of the stimulable phosphor layer and its amount attached in the present radiation image storage panel (a) and the prior art (b) versus modulation transmission function (MTF) at 2 cycles/mm of space frequency;

DESCRIPTION OF THE PREFERRED EMBODIMENTS

The present invention is to be described in detail below.

Figure 1:
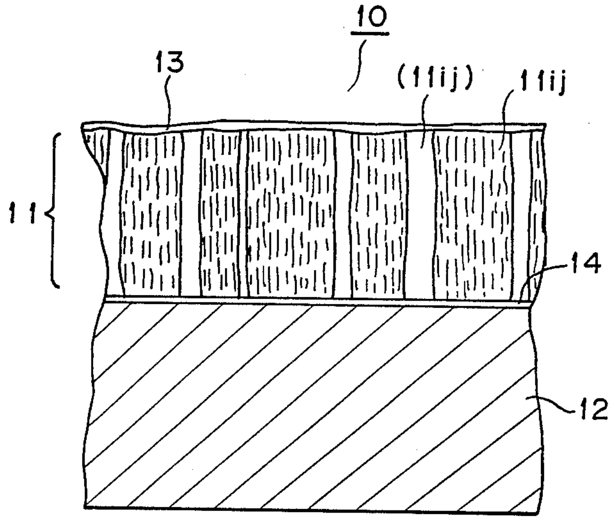
FIG. 1 is a sectional view showing a part of a radiation image storage panel of the present invention.
Figure 2A:
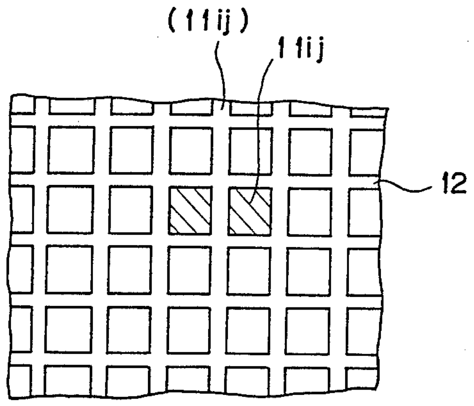
FIGS. 2(*a*) to 2(*d*) are plan views showing a part of radiation image storage panels of the present invention.
Figure 2B:
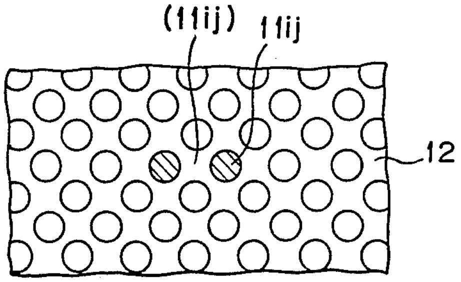
Figure 2C:
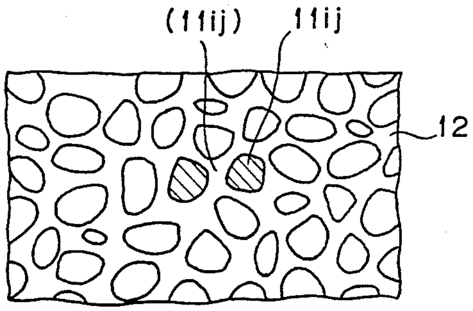
Figure 2D:
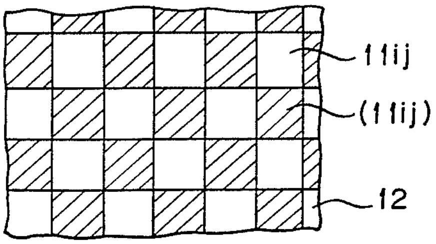

FIG. 1 is a sectional view in the thickness direction of a radiation image storage panel (hereinafter sometimes abbreviated merely as panel when its meaning is distinct).

In the same Figure, 10 is a panel of the present invention 11*ij* are each a fine pillar-shaped block of the stimulable phosphor extending, preferably in the vertical direction (thickness direction), from the support surface, and (11*ij*) are gaps in the form of cracks, grooves or recesses. By the above 11*ij* and (11*ij*), the stimulable phosphor layer 11 with a fine pillar-shaped block structure according to the present invention is formed.

The fine pillar-shaped blocks 11*ij* may have a mean size preferably of 1 to 400 μm, and the gaps may be of any size, provided that the above fine pillar-shaped blocks 11*ij* are optically independent of each other, but preferably 0 to 20 μm on an average. 13 is a protective layer which should preferably be provided, and 14 is an adhesive layer which may optionally be provided for improvement of adhesion of the stimulable phosphor layer to the support.

When a stimulating excitation light enters the stimulable phosphor layer having a fine pillar-shaped block structure optically independent of each other as described above, the stimulating excitation light reaches the bottom of the pillar-shaped blocks while repeating reflection against the inner surfaces of the pillar-shaped blocks due to the optical induction effect of the fine pillar-shaped block structure without being dissipated out of the pillar-shaped blocks. Thus, the sharpness of the image by stimulated emission can be markedly increased.

For the support surface, in addition to the above adhesion layer, the reflection layer or absorption layer for stimulating excitation light and/or stimulated emission may also be applicable.

The above pillar-shaped block structure may be of any desired pattern. FIGS. 2(*a*), (*b*), (*c*) and (*d*) show examples of the pattern.

The thickness of the stimulable phosphor layer 11 in the panel of the present invention, which may differ depending on the sensitivity of the panel to radiation, the kind of the stimulable phosphor, etc., may preferably be within the range of from 10 to 1000 μm, more preferably from 20 to 800 μm.

For formation of the above stimulable phosphor with a fine pillar-shaped block structure, both of a support having a homogeneous smooth surface and a support having a base pattern convenient for formation of a pillar-shaped block structure by attachment or deposition of a stimulable phosphor may be available.

For an arrangement using a support with a homogeneous smooth surface, a mesh mask method may be employed in which a metal mesh knitted with sufficiently fine metal wires (e.g. copper wires) or a perforated mesh densely perforated with a laser beam is pressure contacted on a support, and a stimulable phosphor deposited by the gas phase deposition method such as vacuum vapor deposition, sputtering, etc. forms pillar-shaped blocks; and the molding method in which a mold having a convex pattern conjugated with the fine pillar-shaped block pattern is applied with surface coating with a mold release agent of the silicone type, etc., a stimulable phosphor is filled in the mold, a support is adhered onto the filled surface and the mold is removed to have pillar-shaped blocks exposed. Further, it is possible to use the crack method in which cracks are generated by heat treatment, etc. after uniform vapor deposition.

On the other hand, for the support having a base pattern as mentioned above, a paint containing a stimulable phosphor suspended in a binder is provided by lamination by a means conventionally employed in the printing method or pillar-shaped blocks are permitted to be grown according to the above gas phase deposition method.

The support having a base pattern as mentioned above, when employing the above paint, can be obtained by the method for forming a pattern corresponding to the fine pillar-shaped pattern related to the presence of affinity for the above paint on the support surface similarly as lithography in printing.

It also may be chosen as one method to provide various resist resins conventionally employed in photographic etching which are provided with the above conditions and can yet constitute the above distributed pattern on the support surface.

During this operation, it is convenient also for good adhesion affinity for the above resist resin to use a metal sheet having a metal oxide coating layer thereon as the support.

For formation of metal oxide coating layer, there may be applied techniques for lamination of a metal oxide on a metal surface conventionally used in the technical fields such as hard photomask, preparation of transparent electroconductive films, etc., for example, chemically the coating method, the spraying method or the CVD (Chemical Vapor Deposition) method, or physically the RF ion plating method, the RF sputtering method or the vacuum deposition method, etc.

As the resist resin as mentioned above, various posi-type and nega-type resist resins such as photoresist, vacuum UV-ray photoresist, electron beam resist, X-ray resist, etc. may be employed. For example, the photoresist resin may include those obtained by esterification of naphthoquinoneazide or benzoquinoneazide with novalac resins.

First, the support is coated with the above resist resin, a layer fractional pattern is printed and developed, and further etching is effected according to the wet process or the dry process to the depth until the support surface is exposed, whereby a base layer 11 having a desired pattern comprising a texture of layer fractions 11*ij* and gaps (11*ij*) can be obtained.

On the other hand, when an aluminum plate is used as the support, a pattern of layer fractions can be easily prepared by applying sealing treatment and subsequently heat treatment on the porous aluminum oxide formed on the surface by anodic oxidation.

The above method to be applied for the present invention is a method conventionally used in the technical field of aluminum surface treatment.

First, the anodic oxidation treatment of the aluminum support surface may be carried out, for example, on an aluminum plate having a thickness of about 0.5 mm, on the side where a stimulable phosphor is to be deposited, in a 8% oxalic acid solution, by passage of current at 1 $A/cm^2$ for about 2 hours, whereby an anodically oxidized coating layer comprising porous aluminum oxide is formed.

Next, the coating layer is washed with water and subsequently boiled in boiling water for about 1 hour. As a result, the above porous aluminum oxide is expanded by incorporating water of crystallization to become a coating layer comprising dense crystals.

This operation is the so-called sealing treatment.

After the sealing treatment, heat treatment may be carried out at 250° C. or higher, whereby the above aluminum oxide having water of crystallization will lose said water of crystallization to be shrinked to form a pattern of layer fractions in fine island shapes surrounded and separated from each other by the gaps formed by the cracks due to shrinkage.

The aluminum oxide coating obtained should preferably have a thickness of some μm or more and, in the case of a thin coating, since the layer fractions tend to become greater, it is necessary to select optimally the conditions for the step of anodic oxidation.

The aforesaid aluminum support may be one having particles of impurities on the surface thereof. For example, when an etching treatment by using an about 5% of NaOH solution is performed on the surface thereof, impurities in the support are precipitated and remain thereon without dissolving therein. In this case, examples of impurities may include, for example, Si, Fe, Cu and the like which are dot-like shaped with an average diameter of 0.1 to 7 μm and have black to brown color. On the surface of the support remaining impurities, fine pillarshaped blocks of a stimulable phosphor are formed. Here, it has been known that the aluminum support generally contains Si (25%), Fe (0.4%), Cu, Mn, Mg, Zn, V (each 0.05%), Ti (0.03%) and the like while which may be different depending upon its purity.

Figure 14:
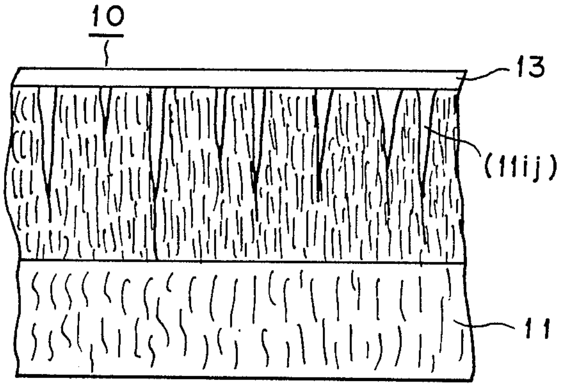
FIG. 14 is a sectional view showing a part of an example of the panel of the present invention.

Further, the aforesaid support may have a structure having a porous chromium layer on the metal support. FIG. 14 is a sectional view of a thickness direction showing a radiation image storage panel of this invention. The porous chromium layer means generally a so-called porous chromium in the field of the plating technology, and has a thin layer of chromium having many fine crevasses and the crevasses may often offer a baggage-like shaped holes which are narrow at the opening and broad at the bottom. In the panel of the present invention, the numbers of the crevasses formed in the porous chromium layer may preferably be present at a density of 5000 to 50000 per $cm^2$ or so. Further, the depth of the crevasse may preferably be 5 to 70% to the thickness of the porous chromium layer, and the porosity of the porous chromium layer may preferably be 10 to 45% or so.

On the surface of the porous chromium layer, fine pillar-shaped blocks of a stimulable phosphor can be formed by the vapor deposition method.

Moreover, between the porous chromium layer and the stimulable phosphor layer as mentioned above, it may be formed an adhesive layer which assist the adhesion of the stimulable phosphor, or a reflective layer or a absorption layer of a stimulable excitation light and/or stimulable emission, if deired.

On the other hand, in the case of the gas phase deposition method, the support having a base pattern as mentioned above may be prepared according to the method in which ink is printed according to gravure printing or silk printing, further preferably with application of burning, and a base pattern corresponding to the fine pillar-shasped pattern is formed; or the method in which a base pattern suitable for the gas phase deposition of a stimulable phosphor physically and/or chemically according to the photographic etching method; or the method in which a base pattern is prepared by applying sealing treatment and heating treatment on an aluminum plate subjected to anodic oxidation.

Thus, a base pattern in the form of fine partitioned regions in shape of islands convenient physically and/or chemically for gas phase deposition is obtained said regions being surrounded by fine streaks, grooves, convexities or cracks, in which gas phase deposition can proceed with difficulty.

When employing the support having a base pattern as mentioned above, a pattern layer having thinly a stimulable phosphor may be formed on a support and the gas phase deposition method may subsequently be applied on the base pattern.

The radiation image storage panel of the present invention may preferably comprise a support making on its surface a large number of fine concavo-convex patterns by, for example, the above method, and a stimulable phosphor layer comprising a fine pillar-shaped block structure having the above surface structure inherited thereon.

Figure 3A:
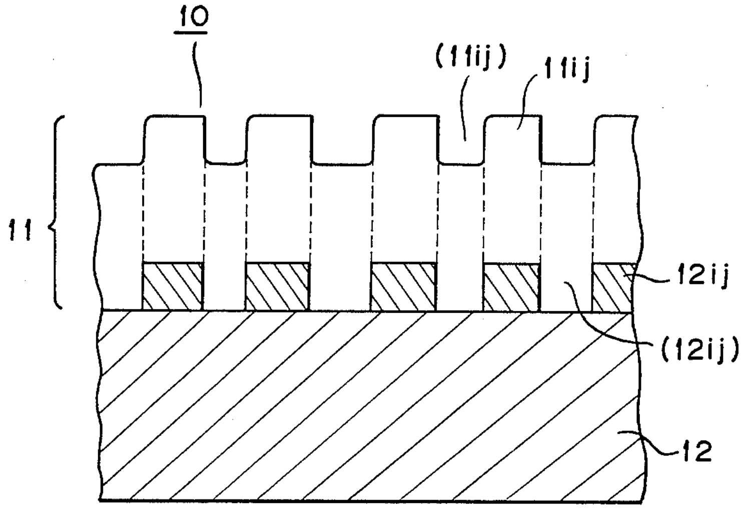
FIGS. 3(*a*) and 3(*b*) are sectional views showing a part of a radiation image storage panel of the present invention and the support surface during the manufacturing steps.
Figure 3B:
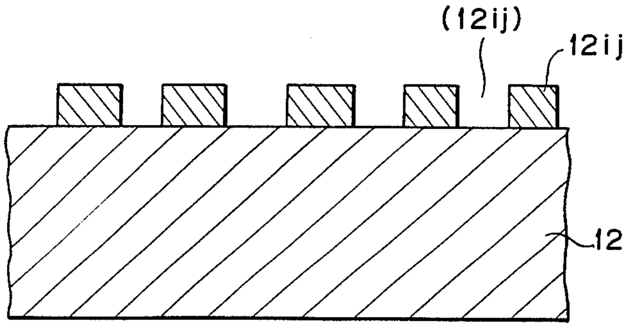

FIG. 3(*a*) is a sectional view of a radiation image storage panel of the present invention. The same Figure (*b*) is a sectional view in the thickness direction of a support having a concavo-convex pattern before provision of the stimulable phosphor layer having the above fine pillar-shaped block structure.

The distributed pattern on the above support may be any desired pattern such as shown in FIGS. 2(*a*), 2(*b*), 2(*c*) or 2(*d*).

Figure 4:
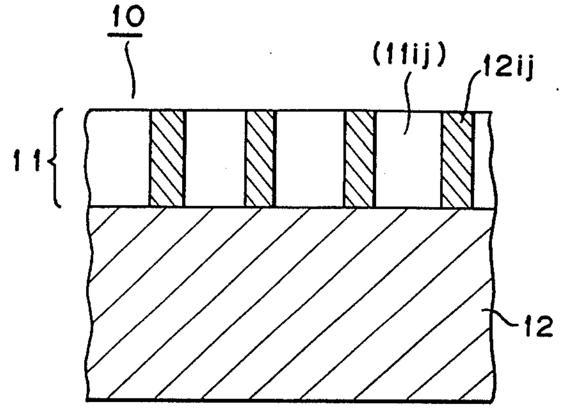
FIG. 4 shows an example of a radiation image storage panel of the present invention.

In FIGS. 3(*a*), 3(*b*) and FIG. 4, the same symbols have the same meanings in function.

In FIG. 3(*a*), 10 is a panel, 12*ij* are convexities possessed by the support and (12*ij*) concavities thereof. 12 is a support. 11*ij* are each fine pillar-shaped block of the stimulable phosphor having the above convexities inherited as such, and (11*ij*) are each pillar-shaped block having inherited the above convexities (12*ij*).

By the above 11*ij* and (11*ij*), the stimulable phosphor layer 11 comprising a fine pillar-shaped block structure according to the present invention can be formed.

The above convexities 12*ij* and concavities (12*ij*) should preferably have a mean size of 10 to 400 μm, preferably 15 to 100 μm.

Further, the above concavo-convex surface of the support may also be provided with an adhesive layer for aiding adhesion of the stimulable phosphor layer or a reflection layer or an absorption layer for stimulating excitation light and/or stimulated emission.

The above stimulable phosphor layer 11, since it is deposited while growing crystals with maintenance of the concavo-convex structure on the support surface during deposition, the boundary between the fine pillar-shaped block grown on the concavity (12*ij*) and the fine pillar-shaped block 11*ij* grown on the convexity 12*ij* becomes incontinuous as crystals, whereby the pillar-shaped block (11*ij*) and the pillar-shaped block 11*ij* become structures optically independent of each other.

For this reason, when stimulating excitation light enters the stimulable phosphor layer having fine pillar-shaped block structures independent of each other, said excitation light reaches the bottom of the pillar-shaped block while repeating reflection against the inner surface of the pillar-shaped block due to the optical induction effect of the fine pillar-shaped block structure without being dissipated out of the block, where it is absorbed or reflected, and again emits in the pillar direction while repeating against the inner surface of the block. Thus, sharpness of the image can be markedly increased while increasing the chances of stimulating excitation.

In the present invention, as shown in FIG. 4, the panel may have a structure such that the stimulable phosphor layer is polished so as to have the convexity 12*ij* exposed on the support surface after deposition or the stimulable phosphor layer 11.

In the present invention, it is also preferable in the constitution shown in FIG. 3(*a*) that the radiation image storage panel should have a support having a surface structure in which a large number of fine tiles lie while being separated from each other with fine gaps and a stimulable phosphor comprising a fine pillar-shaped block structure having the above surface structure inherited as such thereon.

More specifically, in the radiation image storage panel of the present invention, the surface of the support has a structure in which a large number of fine tiles with sizes of about 1 to 400 μm lie as separated from each other with gaps in the form of cracks, grooves or recesses with widths of 0.01 to 20 μm, practically with widths of 10 μm or less, and preferably 5 μm or less, while the stimulable phosphor layer is formed on the above fine tiles, thus comprising fine pillar-shaped blocks separated from each other with the above gaps remaining deeply as such in the thickness direction. With such a structure optically independent of each other, the stimulating excitation light entering the stimulable phosphor layer progresses only in the vertical direction relative to the support while effecting total refelection through the fine pillar-shaped block without substantially no dissipation in the lateral direction. Particularly, since the gaps on the support surface remain as such, the fine pillar-shasped blocks forming the stimulable phosphor layer is optically completely independent of each other, whereby dissipation of the stimulating excitaion layer in the lateral direction is very small.

For formation of a stimulable phosphor layer with a fine pillar-shaped block structure, the gas phase deposition method such as vacuum vapor deposition, sputtering, etc. is preferable from the viewpoint of sensitivity and the technical aspect for formation of pillar-shaped blocks.

Also, as the support having a surface structure like a large number of fine tiles surrounded by fine gaps as described above, a support of an anodically oxidized aluminum plate applied with sealing treatment and subsequently with heat treatment is preferred, and the production method by use of said support is useful.

Figure 5A:
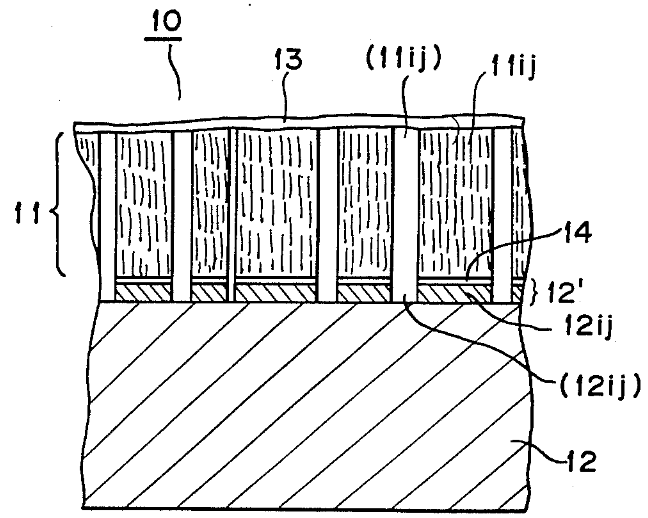
FIGS. 5(*a*) and 5(*b*) are sectional views showing a part of a radiation image storage panel and the support surface during manufacturing steps.
Figure 5B:
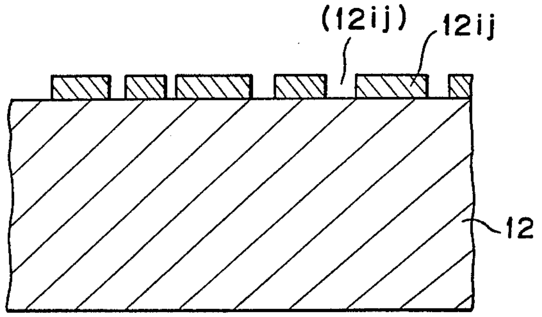

FIG. 5(*a*) is a sectional view cut in the thickness direction of a radiation image storage panel showing an embodiment of the present invention. The same Figure (*b*) is a sectional view of a support having a surface structure in which the above fine tiles lie as separated from each other with fine gaps before provision of the stimulable phosphor layer having the above fine pillar-shaped block structure.

The distributed pattern of the above fine tiles on the support may be any desired pattern. Examples of distributed patterns are shown in FIGS. 2(*a*), (*b*), (*c*), and (*d*).

In FIGS. 5(*a*) and (*b*) and FIGS. 2(*a*)-(*d*), the same symbols have the same meanings in function.

In FIGS. 5(*a*) and (*b*), 10 is a panel of the present invention, 12*ij* are each fine tile on the support surface, (12*ij*) are gaps in the form of cracks, grooves or recesses surrounding said fine tiles. 12′ is a distributed pattern layer of fine tiles dispersed in shape of islands on the support surface formed of the above 12*ij* and (12*ij*). 12 is a support. 11*ij* are each a fine pillar-shaped block of the stimulable phosphor deposited according to the gas phase deposition method on the above fine tiles, and (11*ij*) are gaps remaining deeply between the 11*ij* selectively deposited on 12*ij*.

14 is an adhesive layer which may be provided, if desired, and 13 is a protective layer which should preferably be provided.

By the above 11*ij* and (11*ij*), the stimulable phosphor layer 11 according to the present invention comprising a fine pillar-shaped block structure is formed.

The gaps (11*ij*) as herein mentioned are also inclusive of the case when mere cracks giving substantially no gap are only formed on the stimulable phosphor layer surface, and therefore a fine multipyramid block structure is included within the fine pillar-shaped block structure.

Figure 6:
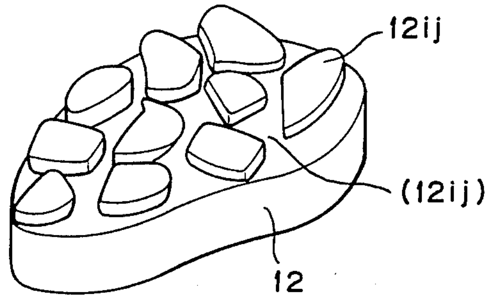
FIG. 6 is a plan view showing examples of distributed patterns of fine tiles.

As an example of the pattern formed by the fine tiles 12*ij* and fine gaps (12*ij*), a perspective view of an aluminum support subjected to anodic oxidation treatment, sealing treatment and heating treatment is shown in FIG. 6.

On the fine tiles 12*ij*, the above adhesive layer 14, and reflection layer or absorption layer for stimulated emission and/or stimulating excitation light may be provided similarly to provide a multi-layer structure.

In the present invention, it is also preferable that the radiation image storage panel should have a large number of fine tiles on a support surface, a fine-strings net surrounding said fine tiles and separating them from each other, and a stimulable phosphor layer with a block structure extending in the thickness direction on said fine tiles.

Figure 7A:
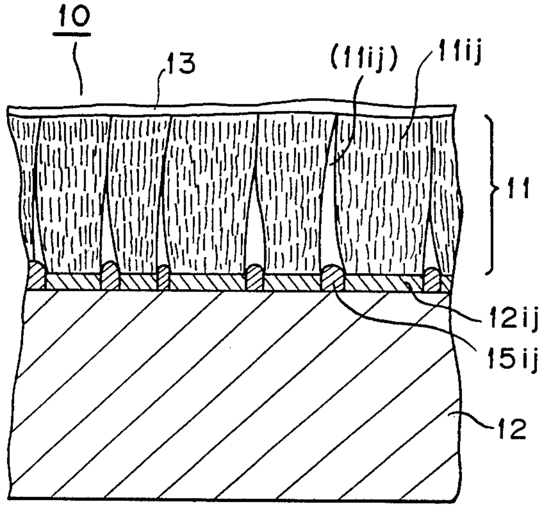
FIGS. 7(*a*) to 7(*c*) are sectional views showing a part of a radiation image storage panel of the present invention and the support suurace during manufacturing steps.
Figure 7B:
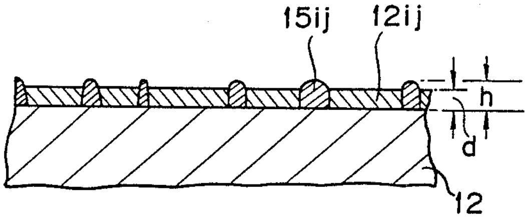
Figure 7C:
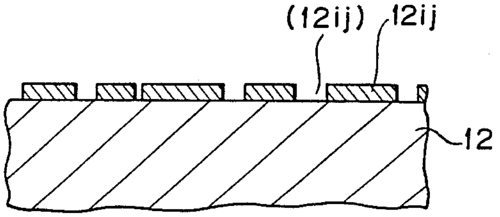

FIG. 7(*a*) is as sectional view in the thickness direction of a radiation image storage panel of the present invention. The same Figure (*b*) is a sectional view of the support having the fine tiles and the above fine-strings net surrounding and separating said fine tiles provided thereon before provision of the stimulable phosphor layer having a fine pillar-shaped block structure, and the same Figure (*c*) of the support having only the fine tiles without providing said fine-strings net yet.

In FIG. 7(*a*), 10 is a panel of the present invention, 12*ij* are fine tiles each having a thickness d, and (12*ij*) are gaps in the form of cracks, grooves or recesses surrounding the fine tiles. 15*ij* are fine strings of a fine-strings net with a height h which are formed filling the above (12*ij*) and separate the respective 12*ij* from each other, h being preferably not smaller than d.

11*ij* are each a fine pillar-shaped block of the stimulable phosphor deposited on the fine tile plate 12*ij*, and (11*ij*) are gaps between fine pillar-shaped blocks 11*ij*. By 11*ij* and (11*ij*), the stimulable phosphor layer 11 having a fine pillar-shaped block structure according to the present invention can be formed. 13 is a protective layer which should preferably be provided, and 12 is a support.

The gap (11*ij*) as herein mentioned is also inclusive of the case of forming only a crack which does not give a substantial gap, and therefore the fine pillar-shaped block structure includes also a fine multipyramid block structure.

Further, in the present invention, it may be to employ a radiation image storage panel provided with a stimulable phosphor comprising a fine pillar-shaped block structure having crevasse developed from the gap between the fine tiles toward the layer surface by applying a shock treatment on a stimulable phosphor layer deposited in the thickness direction on the surfaces of the fine tiles distributed in a large number and scattered with gaps therebetween, and also a process for producing such a panel realizing the above structure.

A preferred embodiment of the present invention can be given when the above mentioned shock treatment is heat treatment.

Figure 8A:
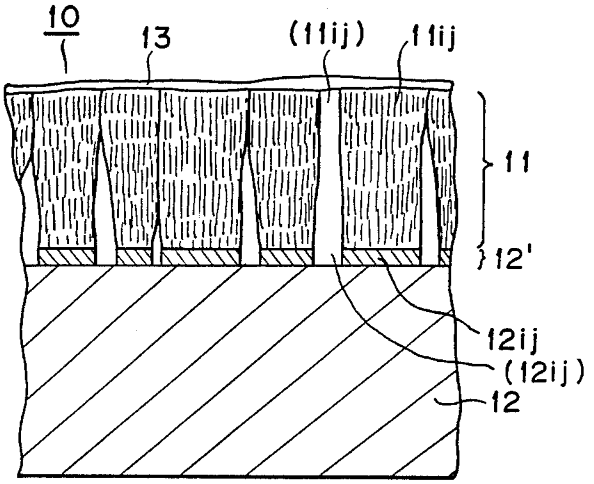
FIGS. 8(*a*) to 8(*c*) are sectional views showing a part of a radiation image storage panel of the present invention and the support surface during manufacturing steps.
Figure 8B:
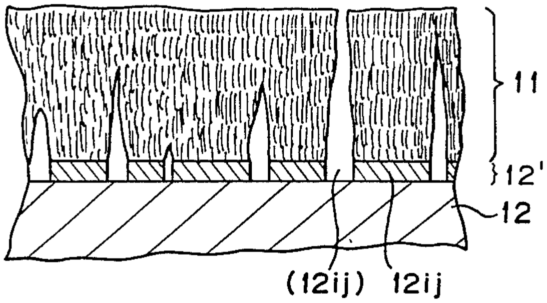
Figure 8C:
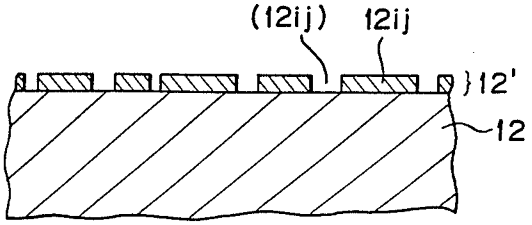

FIG. 8(*a*) is a sectional view of a radiation image storage panel cut in the direction of thickness. The same Figure (*b*) is a sectional view in the direction of thickness of a panel when the above stimulable phosphor layer is deposited before application of shock treatment, and the same Figure (*c*), further going back to the previous state, that of a support having only fine tiles without deposition of the above stimulable phosphor layer.

The above fine tiles may be distributed on the support in any desired pattern.

In FIG. 8(*a*)–10 is a panel of the present invention, 12*ij* are each fine tile on the support surface, (12*ij*) are gaps in the form of cracks, grooves, recesses, etc. surrounding the fine tiles. 12' is a distributed pattern layer of the fine tiles scattered in shape of islands of the surface made of the above **12*ij* and (12*ij***).

(**11*ij*) is a cavity to be remained within the deposition layer, which is formed in the course of progressing deposition of the stimulable phosphor on the above distributed pattern layer 11 by first depositing the stimulable phosphor on the fine tiles 12*ij* and gradually expanding the deposition area until at last effecting bonding of the deposited layer, which cavity may sometimes be very small or reach even the surface to become a crevasse depending on the size of the gaps (12*ij*). 11 is a stimulable phosphor deposition layer including the above mentioned cavity or crevasse (11*ij*). 11*ij* are each fine pillar-shaped block having the stimulable phosphors deposited on the fine tiles isolated from each other by application of a shock treatment on the above deposited layer 11 to thereby develop each cavity (11*ij*) to the surface of the deposited layer to form a crevasse. (11*ij*) are crevasses between the fine pillar-shaped blocks 11*ij*. By the above 11*ij* and (11*ij*), the stimulable phosphor layer 1** having a fine pillar-shaped block structure according to the present invention is formed.

12 is a support and 13 is a protective layer which should preferably be provided.

Furthermore, in the present invention, in contrast with the aforesaid crevasse, it may be employed a radiation image storage panel provided with a stimulable phosphor layer having crevasse developed from the surface of the layer.

In this case, in order to provide the crevasse developed from the layer surface of the stimulable phosphor into the phosphor layer, a method may be employed in which after formation of a stimulable phosphor layer by means of, for example, various vapor deposition methods, the aforesaid crevasse is formed by providing a thermal shock and the like. That is, the aforesaid crevasse can be formed by carrying out a heating and cooling utilizing the difference of the thermal expansion between the stimulable phosphor and the support.

More specifically, for example, an original panel deposited a stimulable phosphor thereon is heated to 300° C. or so in an inert gas such as nitrogen gas, and after reaching to thermal equilibrium of the original panel, the aforesaid crevasses are formed in the stimulable phosphor layer when the panel is cooled by introducing a large amount of cooled nitrogen gas. In this case, since the crevasses are formed by a strain due to the difference between the surface temperature of the stimulable phosphor layer and the temperature of the support based on specific heats thereof or speeds of cooling, almost all of crevasses occur from the layer surface of the stimulable phosphor layer to provide a structure as shown in FIG. 14. In this occasion, it may be carried out a further heating to the support side positively and cooling to the phosphor side. In case of resulting good effect of cooling, the heating temperature may further be lower, for example, when a cooled alcohol is employed for cooling, at 150° C. or so. The above method for forming crevasses may be interposed during the vapor deposition of the stimulable phosphor layer. Further, the method for forming crevasses is not necessarily limited to the thermal treatment and may be employed any method so long as it can provide crevasses without impairing functions of the panel. For example, it may be employed a method in which at the latter half of formation of the stimulable phosphor layer by vapor deposition, crevasses can be formed by heitening a concentration of an inert gas such as argon to form gaps in the phosphor layer and providing a thermal shock from the side of the layer surface.

Or else, crevasses can be formed by providing an ultrasonic or electrical shock, etc. to a crystalline dislocation line directed to the layer surface, which is formed during deposition.

Further, in the above case, it is not necessary to use a support having a concavo-convex pattern on its surface. A stimulable phosphor layer is formed on a protective layer which protects the panel surface by the vapor deposition, and then crevasses can be introduced by means of the panel producing method to be adhered to the support after deposition.

For example, by using a protective layer film having, on the surface of the protective layer film, a surface structure where a large number of fine concavo-convex patterns or a large number of fine tile-like plates which are separated from each other by fine gaps are spread all over the film, a stimulable phosphor layer is formed by any of the vapor deposition methods. Then, since the stimulable phosphor starts to deposit on the surface of the above protective layer film as fine prismatic crystals, the gaps of these prismatic crystals form in the stimulable phosphor layer crevasses extended to the direction almost perpendicular to said film surface whereby the crevasses which are opened to the layer surface side can be introduced by adhering them to the support.

After formation of the panel having such a structure, the above crevasses may be grown up by subjecting a shock treatment such as a thermal treatment, etc.

The thus obtained fine pillar-shaped blocks become finer pillar-shaped blocks in sizes.

The radiation image storage panel of the present invention may have at least one pillar-shaped stimulable phosphor on the upper part of at least one fine grain layer on the support.

Figure 9A:
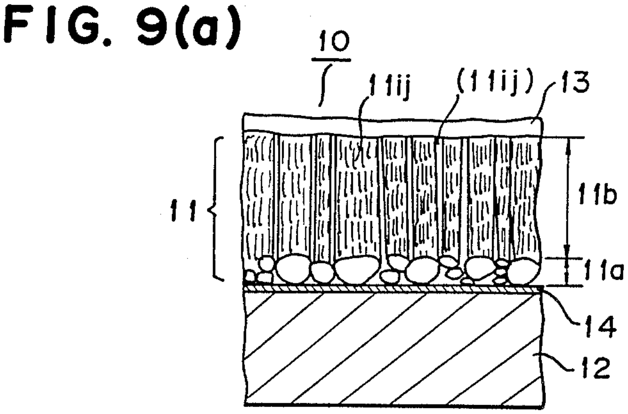
FIGS. 9(*a*) and 9(*b*) are plan views showing a part of an example of the radiation image storage panel of the present invention.
Figure 9B:
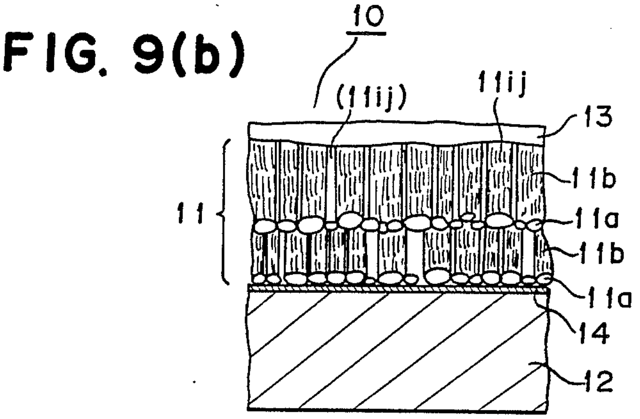

FIGS. 9(*a*) and 9(*b*) are cross sectional views in the thickness direction of the radiation image storage panel of the above embodiment.

Figure 10:
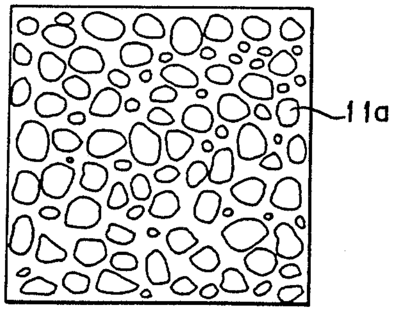
FIG. 10 is a plan view showing a part of the base layer of an example of the radiation image storage panel of the present invention.

FIG. 10 shows the form of a panel of the present invention. **11*ij* are each fine pillar-shasped block in the vertical direction (thickness direction) extended from the support surface, (11*ij*) are each gap between 11*ij* in the form of crack, groove or recess. By the above 11*ij* and (11*ij*), the stimulable phosphor layer 11** having a fine pillar-shaped block structure according to the present invention is formed.

12 is a support, 13 is a protective layer which should preferably be provided, 14 is an adhesive layer which improves adhesion between the stimulable phosphor layer and the support which may optionally be provided. **11*a*** is a layer comprising grains with as thickness of ½ or less of the entire film thickness, preferably 1/10 or less, and the grains may be spread in at least one layer.

The grains to be used may have a mean grains size of 50 μm or less, preferably 15 μm or less. The layer **11*a*** can be obtained according to the gas phase deposition method such as vacuum deposition, sputtering, etc.

As the material for forming the grains, there may be employed various metals, metal oxides such as ZnO, $TiO_2$, $Al_2O_3$, etc., metal sulfides such as ZnS, etc., amorphous silicon, compounds such as SiC, SiN, $SiO_2$, etc., or otherwise alkali halide crystals and stimulable phosphors as hereinafter described. Among them, alkali halide crystals are preferred for obtaining a fine pillarshaped pillar structure **11*ij*** of a stimulable phosphor on the grains.

The layer **11*a* as shown in FIG. 10** may be obtained by, for example, vapor deposition of alkali halide crystals, etc. in a vacuum of about $10^{-3}$ Torr.

After the layer **11*a* is obtained, fine pillar-shaped blocks 11*ij* can be grown on the grains according to the gas phase deposition method. During this operation (the layer 11*a* also has the effect of enhancing adhesion to 11*ij***), for laminating a plurality of layers of the constitution as described above, the above layer constituting operation may be repeated for a necessary number of times.

The radiation image storage panel of the present invention may also have a stimulable phosphor layer with at least two layers of pillar-shaped block structure.

Figure 11:
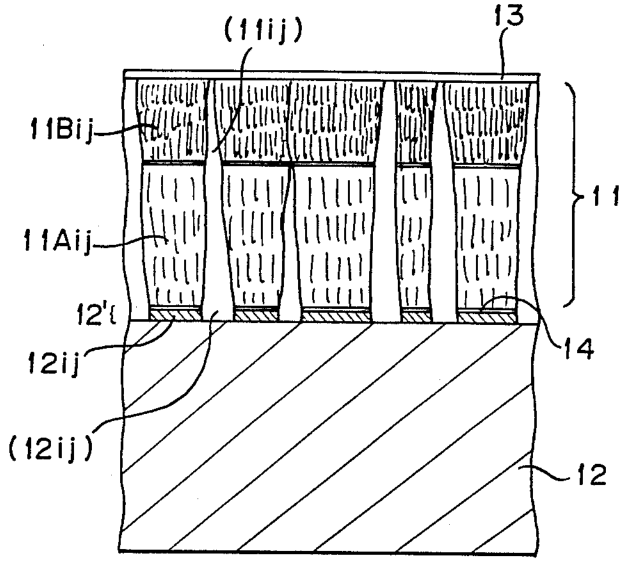
FIG. 11 is a sectional view showing a part of an example of the panel of the present invention.

FIG. 11 is a sectional view in the thickness direction of a radiation image storage panel of the above embodiment, in which 11 is the recording layer of the panel and 12 is a support.

12' is a base layer having a thickness of ½ or less, preferably 1/10 or less of the film thickness of the recording layer 11, said base layer 12' comprising layer fractions **12*ij* dispersed in shape of islands as exemplified in FIG. 10 and gaps (12*ij***) shaped in concavities or cracks therearound separating the islands mutually from each other.

11 is a stimulable phosphor layer to be constituted on the above base layer 12', which is constituted on the layer fractions **12*ij* of the above base layer 12'. It is a layer comprising a mass of at least two layers of pillar-shaped blocks 11*ij* and the gaps (11*ij*) formed corresponding to the above gaps (12*ij*). In FIG. 11, as 11*ij*, there is shown an example of pillar-shaped blocks of fine pillar-shaped blocks 11A*ij* and 11B*ij* comprising stimulable phosphors A and B. The mean size of 11*ij*** should preferably be 1 to 400 μm.

In the bonded portion between the above **11A*ij* and 11B*ij***, other substances convenient for mutual bonding may be permitted to exist, and further the bonded portion may be given a function such as of a filter, etc. Also, provided that two or more layers are constituted, the above stimulable phosphors A and B may be either the same or different.

The stage number of the block lamination is not limited, and it is possible to make a continuous constitution (infinite stage number) in which a certain characteristic of the stimulable phosphor, for example, optical reflectance, etc., is changed continuously. (**11*ij*) are crevasses or boundaries between the pillar-shaped blocks 11*ij* formed corresponding to the gaps (12*ij*) as described above, which are provided to make respective 11*ij* optically independent of each other, and the width of (11*ij*) may preferably be 0 to 20 μm. In the present invention, the above (11*ij***) are called comprehensively as crevasse.

13 shows a protective layer and 14 an adhesive layer between the base layer 12' and the stimulable phosphor layer 11. These layers are provided, if necessary.

The stimulable phosphor in the radiation image storage panel of the present invention refers to a phosphor exhibiting stimulated emission corresponding to the dose of the first light or high energy radiation by optical, thermal, mechanical or electrical stimulation (stimulating excitation) after irradiation of the first light or high energy radiation, preferably a phosphor exhibiting stimulated emission by a stimulating excitation light of 500 nm or longer. As the stimulable phosphor to be used for the radiation image storage panel of the present invention, there may be included, for example, those represented by $BaSO_4:Ax$ (where A is at least one of Dy, Tb and Tm, x is $0.001 \leq x < 1$ mol %) as disclosed in Japanese Provisional Patent Publication No. 80487/1973; those represented by $MgSO_4:Ax$ (where A is either Ho or Dy, x is $0.001 \leq x \leq 1$ mole %) as disclosed in Japanese Provisional Patent Publication No. 80488/1973; those represented by $SrSO_4:Ax$ (where A is at least one of Dy, Tb and Tm, x is $0.001 \leq x < 1$ mole %) as disclosed in Japanese Provisional Patent Publication No. 80489/1973; those in which at least one of Mn, Dy and Tb are added to $Na_2SO_4$, $CaSO_4$ and $BaSO_4$, etc. as disclosed in Japanese Provisional Patent Publication No. 29889/1976; those such as BeO, Lif, $MgSO_4$ and $CaF_2$, etc. as disclosed in Japanese Provisional Patent Publication No. 30487/1977; those such as $Li_2B_4O_7Cu$, Ag, etc. as disclosed in Japanese Provisional Patent Publication No. 39277/1978; those such as $Li_2O.(B_2O_2)x:Cu$ (where x is $2 < x \leq 3$) and $Li_2O.(B_2O_2)x:Cu,Ag$ (where x is $2 < x \leq 3$), etc. as disclosed in Japanese Provisional Patent Publication No. 47883/1979; those represented by SrS:Ce,Sm, SrS:Eu,Sm, $La_2O_2S:Eu,Sm$ and (Zn, Cd)S:Mn,X (where X is a halogen) as disclosed in U.S. Pat. No. 3,859,527. Also, ZnS:Cu,Pb phosphors as disclosed in Japanese Provisional Patent Publication No. 12142/1980; barium aluminate phosphors represented by the formula $BaO.xAl_2O_3:Eu$ (where $0.8 \leq x \leq 10$) and alkaline earth metallosilicate type phosphors represented by the formula $M^{II}O.xSiO_2:A$ (where $M^{II}$ is Mg, Ca, Sr, Zn, Cd or Ba, A is at least one of Ce, Tb, Eu, Tm, Pb, Tl, Bi and Mn and x is $0.5 \leq x \leq 2.5$) may be employed. Additional examples of phosphors may include, as disclosed in Japanese Provisional Patent Publication No. 12143/1980, those represented by the following formula:

$$(Ba_{1-x-y}Mg_xCa_y)FX:eEu^{2+}$$

(where X is at least one of Br and Cl, each of x, y and e is a number satisfying the condition of $0 < x+y \leq 0.6$, $xy \neq 0$ and $10^{-6} \leq e \leq 10^{-2}$); those as disclosed in Japanese Provisional Patent Publication No. 12144/1980 which corresponds to U.S. Pat. No. 4,236,078:

$$LnOX:xA$$

(where Ln represents at least one of La, Y, Gd and Lu; X represents Cl and/or Br; A represents Ce and/or Tb; and x represents a number satisfying $0 < x < 0.1$); those as disclosed in Japanese Provisional Patent Publication No. 12145/1980:

$$(Ba_{1-x}M^{II}x)FX:yA$$

(where $M^{II}$ represents at least one of Mg, Ca, Sr, Zn and Cd; X represents at least one of Cl, Br and I; A represents at least one of Eu, Tb, Ce, Tm, Dy, Pr, Ho, Nd, Yb and Er; x and y represent numbers satisfying the conditions of $0 \leq x \leq 0.6$ and $0 \leq y \leq 0.2$); those as disclosed in Japanese Provisional Patent Publication No. 84389/1980:

$$BaFX:xCe,yA$$

(where X is at least one of Cl, Br and I; A is at least one of In, Tl, Gd, Am and Zr; x and y are each $0 < x \leq 2 \times 10^{-1}$ and $0 < y \leq 5 \times 10^{-2}$); those as disclosed in Japanese Provisional Patent Publication No. 160078/1980:

$M^{II}FX,xA:yLn$ (where $M^{II}$ is at least one of Mg, Ca, Ba, Sr, Zn and Cd; A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one of Eu, Tb, Ce, Tm, Dy, Pr, Ho, Nd, Yb, Er, Sm and Gd; X is at least one of Cl, Br and I; x and y are each number satisfying the conditions of $5\times10^{-5}\leqq x\leqq0.5$ and $0<y\leqq0.2$) (rare earth element activated divalent metal fluoride phosphors);

ZnS:A, (Zn,Cd)S:A, CdS:A, ZnS: A, X and CdS:A,X (where A is Cu, Ag, Au or Mn; X is a halogen); those as disclosed in Japanese Provisional Patent Publication No. 148285/1982:

$xM_3(PO_4)_2.NX_2:yA$ [I]

$M_3(PO_4)_2.yA$ [II]

(where each of M and N represents at least one of Mg, Ca, Sr, Ba, Zn and Cd; X represents at least one of F, Cl, Br and I; A represents at least one of Eu, Tb, Ce, Tm, Dy, Pr, Ho, Nd, Er, Sb, Tl, Mn and Sn; x and y are integers satisfying the conditions of $0<x\leqq6$ and $0\leqq y\leqq1$);

$nReX_3\cdot mAX'_2:xEu$ [III]

$nReX_3\cdot mAX'_2:xEu,ySm$ [IV]

(where Re represents at least one of La, Gd, Y and Lu; A represents at least one of alkaline earth metals Ba, Sr and Ca; X and X' each represent at least one of F, Cl and Br; and x and y are integers satisfying the conditions of $1\times10^{-4}<x<3\times10^{-1}$ and $1\times10^{-4}<y<1\times10^{-1}$, and n/m satisfies the condition of $1\times10^{-3}<n/m<7\times10^{-1}$; and $M^IX\cdot aM^{II}X'_2\cdot bM^{III}X''_3:cA$ (where $M^I$ is at least one alkali metal selected from Li, Na, K, Rb and Cs, preferably Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X'' are each at least one halogen selected from F, Cl, Br and I; A is at least one metal selected from Eu, Tb, Ce, Tm, Dy, Pr, Ho, Nd, Yb, Er, Gd, Lu, Sm, Y, Tl, Na, Ag, Cu and Mg, preferably Tl; a is a numeral within the range of $0\leqq a<0.5$, b is a numeral within the range of $0\leqq b<0.5$ and c is a numeral within the range of $0<c\leqq0.2$) (alkali halide phosphors). Particularly, alkalide halide phosphors are preferable, because stimulable phosphor layers can be formed easily according to the method such as vacuum vapor deposition, sputtering, etc.

However, the stimulable phosphor to be used in the radiation image storage panel of the present invention is not limited to those as described above, but any phosphor which can exhibit stimulated fluorescence when irradiated with a stimulating excitation light after irradiation of radiation may be useful.

The radiation image storage panel of the present invention may have a group of stimulable phosphor layers comprising one or more stimulable phosphor layers comprising at least one of the stimulable phosphors as mentioned above. The stimulable phosphors to be contained in respective stimulable phosphor layers may be either identical or different.

In the radiation image storage panel of the present invention, various polymeric materials, glasses, metals, etc. may be used as the support. Particularly, materials which can be worked into flexible sheets or webs are preferred in handling of information recording materials. In this respect, it is preferable to use plastic films such as cellulose acetate film, polyester film, polyethyleneterephthalate film, polyamide film, polyimide film, triacetate film, polycarbonate film, etc.; metal sheets such as of aluminum, iron, copper, chromium, etc. or metal sheets having coated layers of the oxides of said metals.

These supports may have thicknesses, which may differ depending on the material of the support, may generally be 80 μm to 1000 μm, more preferably 80 μm to 500 μm from the standpoint of handling.

In the radiation image storage panel of the present invention, it is preferable to provide a protective layer for protecting physically and chemically the group of stimulable phosphor layers generally on the surface at which the above stimulable phosphor layer is exposed. The protective layer may be formed by direct coating of a coating liquid for protective layer on the stimulable phosphor layer, or alternatively a protective layer previously formed separately may be adhered onto the stimulable phosphor layer. The materials for the protective layer may include conventional materials for protective layer such as cellulose acetate, nitrocellulose, polymethyl methacrylate, polyvinyl butyral, polycarbonate, polyester, polyethyleneterephthalate, polyethylene, polyvinylildene chloride, Nylon (trade name), etc.

The protective layer may also be formed by laminating inorganic substances such as SiC, $SiO_2$, SiN, $Al_2O_3$, etc. according to the vacuum deposition method, the sputtering method, etc.

These protective layers may have thicknesses preferably of about 0.1 μm to 100 μm.

Next, the gas phase deposition methods in which the above stimulable phosphor layer contains no binder are to be described.

A first method is the vacuum deposition method. In this method, a support is first set in a vacuum deposition device and the device is evacuated to a vacuum degree of about $10^{-6}$ Torr.

Then, at least one of the above stimulable phosphors is evaporated by heating according to the resistance heating method, the electron beam method, etc. to have the stimulable phosphor deposited on the above support surface.

As a result, a stimulable phosphor layer containing no binder is formed, and it is also possible to form the stimulable phosphor for plural divided times in the above vapor deposition step. Also, in the above vapor deposition step, a plurality of resistance heaters or electron beams may be employed to effect co-deposition.

After completion of vapor deposition, if desired, on the side opposite to the support side of the above stimulable phosphor layer, a protective layer is preferably provided to produce the radiation image storage panel of the present invention.

Alternatively, it is also possible to use the procedure in which the support is provided after formation of the stimulable phosphor layer on the protective layer.

In the above vacuum vapor deposition method, it is also possible to form a stimulable phosphor layer simultaneously with synthesis of the desired phosphor layer on a support by co-depositing starting materials of a stimulable phosphor by means of a plural number of resistance heaters or electron beams.

Further, in the above vacuum vapor deposition method, the subject on which vapor deposition is effected (support or protective layer) may be cooled or heated, if desired. Also, after completion of vapor deposition, the stimulable phosphor layer may be subjected to heating treatment.

A second method is the sputtering method. In this method, after a support is set in a sputter device similarly as in the vapor deposition method, the device is once internally evacuated to a vacuum degree of about $10^{-6}$ Torr, and then an inert gas such as Ar, He, etc. is introduced as the gas for sputter into the sputter device to adjust the gas pressure at about $10^{-3}$ Torr.

Then, using the above stimulable phosphor as the target, sputtering is effected to deposit the stimulable phosphor on the above support surface to a desired thickness.

In the above sputter step, the stimulable phosphor layer can be formed for plural divided times similarly as in the vacuum vapor deposition method, or alternatively the stimulable phosphor layer can be formed by use of a plurality of targets comprising stimulable phosphors different from each other by sputtering at the same time or successively the above targets.

After completion of sputter, similarly as in the vacuum vapor deposition method, a protective layer may be formed, if desired, on the side opposite to the support side of the above stimulable phosphor layer to produce a radiation image storage panel of the present invention. Alternatively, it is also possible to use the procedure in which the support is provided after formation of the stimulable phosphor layer on the protective layer.

In the above sputter method, it is also possible to use a plurality of starting materials for the stimulable phosphor as the targets and sputtering these at the same time or successively to form a stimulable phosphor layer simultaneously with synthesis of the stimulable phosphor. Alternatively, in the above sputter method, reactive sputter may also be conducted by introducing a gas such as $O_2$, $H_2$, etc., if necessary.

Further, in the above sputter method, the subject to be sputtered thereon (support or protective layer) may be either cooled or heated. Also, the stimulable phosphor layer may be subjected to heat treatment after completion of sputter.

A third method is the CVD method. According to this method, an organometallic compound containing the desired stimulable phosphor or starting materials therefor is decomposed with an enrgy such as heat, high frequency power, etc., thereby obtaining a stimulable phosphor layer containing no binder.

Next, by referring to FIGS. 3(*a*) and 3(*b*) the process for producing the panel of the present invention is to be described.

In the present invention, production steps are proceeded in the order of (b)→(a) in FIGS. 3(*a*) and 3(*b*).

Step (b): Support having a fine concavo-convex pattern:

The base pattern having concavities (12*ij*) and convexities 12*ij* on the surface of the support 12 can be made according to the embossing method which embosses the support itself, the printing method in which drying and curing treatments are applied after printing with the use of an ink containing a resin capable of securing onto a support by curing with light, heat, chemicals, etc., or the photographic etching method. According to the photographic etching method, when using, for example, a light-sensitive resin plate, a mask having a pattern shaped in islands at the opaque portion for light is closely attached on the surface of, for example, a Nylon type light-sensitive resin (Printight; produced by Toyo Boseki K.K.), followed by irradiation with UV-ray containing wavelengths of a light-sensitive wavelength region from 250 to 400 nm. After exposure, the light-sensitive resin is developed. By this development, in the case of the above light-sensitive resin, the non-exposed portion is flowed away and the exposed portion remains as the convexity.

Step (a): Stimulable phosphor layer 11:

As the method for forming the above stimulable phosphor layer having a fine pillar-shaped block structure, the gas phase deposition method is the most preferred from aspects of certainty in said pillar-shaped block formation and sensitivity.

In the process for producing the panel as shown in FIGS. 5(*a*) and (*b*) of the present invention, the production steps are proceeded in the order of (b)→(a).

Step (b): Distributed pattern of fine tiles plates 12*ij* and gaps (12*ij*):

Conducted according to the same method as in FIG. 11 as described above.

Step (a): Stimulable phosphor 11:

Conducted according to the same method as in FIG. 3(*a*) as described above.

In the process for producing the panel of the present invention as shown in FIGS. 7(*a*)-(*c*) the production steps are proceeded in the order of (c)→(b)→(a).

In FIGS. 7(*a*)-(*c*), the respective steps (c) and (a) are conducted in the same manner as the stps (b) and (a) in FIGS. 5(*a*) and (*b*) as described above.

Step (b): Fine-strings net 15:

The material for the fine-strings net 15 constituted by surrounding the respective fine tiles 12*ij* as mentioned above and filling the gaps (12*ij*) with fine strings 15*ij* may preferably be one different in crystallization conditions or/and physical properties such as thermal expansion, etc., practically a metal. The fine-strings net comprising said metal may be prepared according to the known electric plating method.

Accordingly, when employing a plastic which is a dielectric material as the support, an electroconductive layer such as a metal or indium oxide, etc. is provided on its surface according to vacuum vapor deposition or other methods before practicing the above step (c), and said electroconductive layer is required to be exposed by etching. The same is the case when a metal sheet having a metal oxide coating layer is used.

By performing electric plating in a conventional manner on the support having satisfied the above conditions, a fine-strings net 15 comprising, for example, nickel or chromium is formed. For depositing conveniently the stimulable phosphor as fine pillar-shaped blocks on the fine tiles 12*ij* in this case, it is better that the height h of the fine string 15*ij* of the fine-strings net 15 should be equal to or greater than the thickness d of the fine tile from the electroconductive support surface.

The steps for production of the panel shown in FIGS. 8(*a*)-(*c*) are proceeded in the order of FIG. 8(*c*)→FIG. 8(*b*)→FIG. 8(*a*).

The step of FIG. 8(*c*) is conducted in the same manner as the successive combination of the above FIG. 5(*b*) and FIG. 7(*b*) and the step of FIG. 8(*b*) in the same manner as the step of the above FIG. 3(*a*).

Step (a): Shock treatment:

The shock treatment is a technique to impart a fine pillar-shaped (or polypyramid-shaped) block structure having an inner reflective surface against the stimulating excitation light incident on the stimulable phosphor layer deposited on the fine tiles **12*ij*** having formed crevasses or cracks formed on the surface by giving shock to the deposited layer with the acting base point, thereby permitting ruptures propagated up to the surface.

Accordingly, any method may be employed, provided that ruptures in the form of crevasses or cracks can be given without impairing the function of the panel.

For example, there may be employed the heat treatment method in which ruptures are formed by carrying out heating or cooling through utilization of the difference in thermal expansion between the stimulable phosphor and the plastic, metal of the support or the fine-strings net as described above, the sonic method in which vibration is given to the crystal dislocation line or the structural distortion existing at the bonded point of the phosphor in the cavity (**11*ij***) to thereby permit the cracks to grow and develop on the surface from the bonded point, or the voltage rupture method simulating insulating destruction of a capacitor with an alternate current, etc.

Since the stimulable phosphor layer 11 having a fine pillar-shaped block structure should preferably have an effective inner reflective surface against stimulating excitation light per each block and at the same time its surface should be substantially continuous and smooth for enhancement of both sensitivity and sharpness, the rupture on the surface should preferably be a crack which gives no substantial gap.

For the above reason, the heat treatment method can be conveniently used.

The heat treatment method may be carried out by heating the panel completed of the above step (b) to about 300° C. in an inert gas such as nitrogen gas, etc. and cooling the panel after it has reached thermal equilibrium by flowing a large amount of cold nitrogen gas, whereby the crack can be developed from the tip of the cavity (**11*ij***) (bonded point of the phosphor) until it reaches the surface. In the case of good cooling effect, the heating temperature may be further lower. For example, a temperature of about 150° C. can be used when cold alcohol is used for cooling.

It is critical in the heat treatment method to have the stimulable phosphor sufficiently adsorbed with an inert gas prior to heating.

By the heat treatment, there will be no generation of peeling, damage or contamination of the stimulable phosphor.

For production of the panel of the present invention shown in FIGS. 9(*a*)-9(*c*) the above gas phase vapor deposition method may be employed. When employing the vacuum vapor deposition method, the device may be made about $10^{-7}$ Torr similarly as described above and, after application of a predetermined treatment on the support, the vacuum degree is controlled to about $4\times10^{-3}$ Torr with argon gas.

Next, current is passed through the boat or crucible, and an alkali halide such as rubidium bromide in the boat or crucible is evaporated according to the resistance heating method. When the crystal grain layer of rubidium bromide can be vapor deposited as shown in FIGS. 2(*a*)-(*d*), vapor deposition is stopped. In this case, the electron beam method may be used in place of resistance heating. And, after the vacuum degree is made about $5\times10^{-6}$ Torr and the temperature of the support is set to 100° C., a rubidium bromide phosphor activated with thallium is vapor deposited to a film thickness of about 250 μm. As a result, the stimulable phosphor with a fine pillar-shaped block structure is deposited on the crystal grain in FIG. 10.

Consequently, a stimulable phosphor layer containing no binder is formed, and it is also possible to effect co-deposition by use of a plurality of resistance heaters or electron beams in the above vapor deposition step.

After completion of vapor deposition, the radiation image storage panel can be produced following prescribed procedures.

In the case of the sputter method, after prescribed operations, in order to obtain the layer **11*a*** in FIGS. 9(*a*)-9(*c*) sputtering is effected with the use of, for example, an alkali halide crystal RbI as the target and sputtering is stopped when a pattern as shown in FIG. 10 is formed. And, further on the layer **11*a***, with the use of, for example, rubidium bromide activated with thallium as the target, sputtering is effected to deposit a stimulable phosphor with a fine pillar-shaped block structure to a desired thickness.

Thereafter, according to the same procedure as described above, a panel of the present invention can be obtained.

Also, after the layer **11*a*** is obtained according to the sputtering method or the CVD method, a stimulable phosphor with a fine pillar-shaped block structure may be deposited to a desired thickness according to the vacuum vapor deposition method. In this case, there are the advantages that the layer thickness can be obtained thinly and uniformly, and also that deposition of the stimulable phosphor with a fine pillar-shaped block structure can be done rapidly.

For formation of the panel of the present invention having at least two layers of pillar-shaped blocks as shown in FIG. 11, either one of the gas phase deposition methods or a successive combination of both may be applied.

Since the stimulable phosphor of the present invention with a pillar-shaped block structure of the present invention can be constituted with selection of optical, electromagnetic or other physical characteristics such as strength, various controlling mechanisms and composite functions can be introduced into the panel.

For example, by making greater the optical density of the uppermost layer, the light-receiving efficiency of the stimulating excitation light incident obliquely on the panel can be improved or by making the uppermost layer highly abrasion resistant, durability of the panel can be improved.

Also, by making, for example, humidity resistance of the uppermost layer greater, humidity resistance of the panel can be improved to enhance its storability.

Figure 12A:
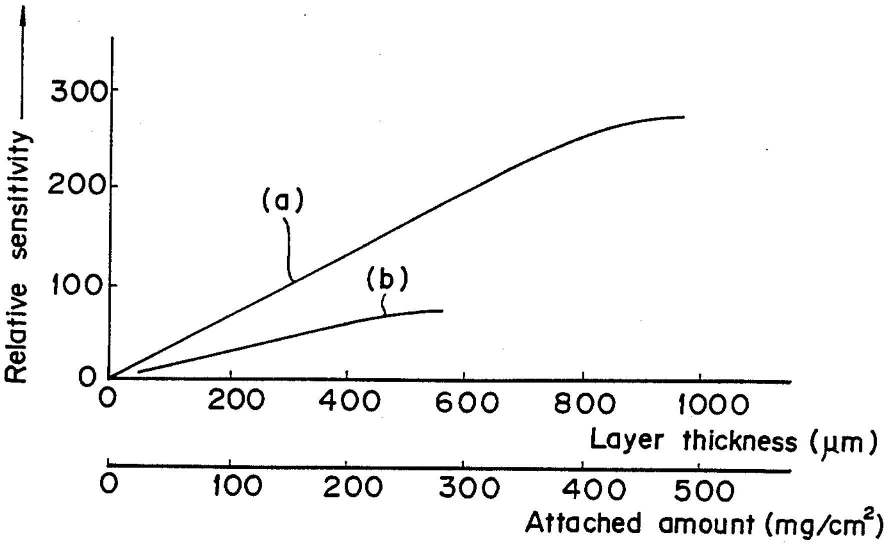
FIG. 12(*a*) is a graph showing the relationship of the layer thickness of the stimulable phosphor layer and its amount attached in the radiation image storage panels concerning an example of the present invention (a) and a prior art (b) versus sensitivity to radiation.
Figure 12B:
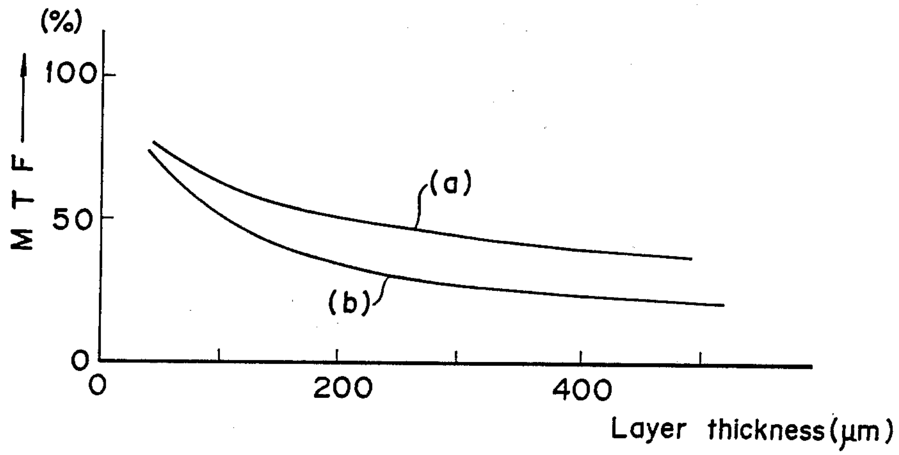

FIG. 12(*a*) shows one examle (line (a)) of the relationship of the layer thickness of the stimulable phosphor in the radiation image storage panel of the present invention obtained by the gas phase deposition method and the amount of the stimulable phosphor attached corresponding to said layer thickness versus the radiation sensitivity.

The stimulable phosphor layer formed by the gas phase deposition method according to the present invention contains no binder, and therefore has an amount of the stimulable phosphor attached (filling ratio) of about 2-fold of that of the stimulable phosphor layer provided by coating of the prior art, whereby not only the radiation absorption per unit thickness of the stimulable phosphor layer can be improved to become higher in sensitivity to radiation, but also graininess of the image can be enhanced.

Further, the stimulable phosphor layer according to the above gas phase vapor deposition method is excellent in transparency, highly transmissive of stimulating excitation light and stimulated emission and therefore the layer thickness can be made thicker than that of the stimulable phosphor layer of the prior art according to the coating method to become still higher in sensitivity to radiation.

An example of sharpness of the panel of the present invention having a fine pillar-shaped block structure obtained as described above is shown in FIG. 12(*b*), line (a).

In the panel of the present invention, due to the optical induction effect of the fine pillar-shaped block structure, the stimulating excitation light repeats reflection on the inner surface of the pillar-shaped blocks with little dissipation out of the pillar-shaped block, and therefore sharpness of the image can be improved and lowering in sharpness accompasnied with increase in layer thickness of the stimulable phosphor can be made smaller at the same time, as apparently seen from comparison with FIG. 12(*b*), line (b) showing the characteristics of the panel of the prior art.

Figure 13:
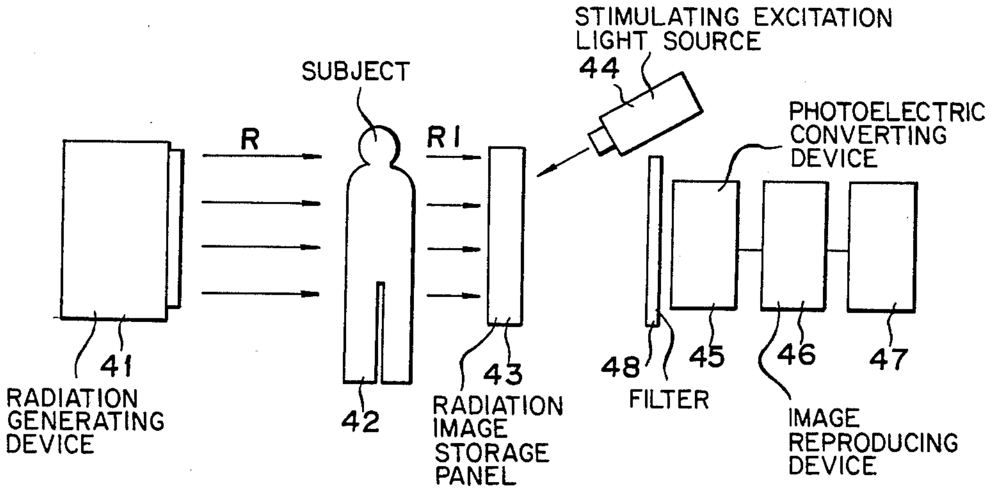
FIG. 13 is a schematic illustration of the radiation image storage method to be used in the present invention.

The radiation image storage panel of the present invention can give excellent sharpness, graininess and sensitivity when employed in the radiation image storage method as schematically shown in FIG. 13. More specifically, in FIG. 13, 41 is a radiation generating device, 42 a subject, 43 a radiation image storage panel of the present invention, 44 a stimulating excitation light source, 45 a photoelectric converting device for detection of the stimulated emission radiated from said radiation image storage panel, and 48 a filter for separating the stimulating excitation light from stimulated emission to permit only the stimulated emission to be permeated therethrough. The devices of 45 et seq are not particularly limited to those as mentioned above, provided that they can reproduce the optical information from 43 as an image in some form.

As shown in FIG. 13, the radiation from the radiation generating device 41 passes through the subject 42 and enters the radiation image storage panel 43 of the present invention. The incident radiation is absorbed by the stimulable phosphor layer of the radiation image storage panel 43, whereby its energy is accumulated to form an accumulated image of the radiation transmitted image. Next, the accumulated image is excited by the stimulating excitation light from the stimulating excitation light source 44 to be released as the stimulated emission. The radiation image storage panel of the present invention, since the stimulable phosphor layer has a fine pillar-shaped block structure, can be inhibited in diffusion of the stimulating excitation light within the stimulable phosphor layer during scanning by the above stimulating excitation light.

The intensity of the stimulated emission radiated is proportional to the radiation energy quantity accumulated, and the optical signal can be converted photoelectrically by means of, for example, a photoelectric converting device 43 such as a photomultiplier tube, etc. and reproduced by an image reproducing device 46 as an image, which is then displayed by an image displaying device, whereby the radiation transmitted image of the subject can be observed.

The present invention is described by referring to the following Examples.

EXAMPLE 1

An aluminum sheet with a thickness of 500 μm as the support was set in a depositing vessel. Next, an alkali halide stimulable phosphor (0.9 RbBr.0.1CsF:0.01 Tl) was placed in a tungsten boat for resistance heating, set on the electrodes for resistance heating and subsequently the deposition vessel was evacuated to a vacuum degree of $2\times10^{-6}$ Torr.

Next, current was passed through the tungsten boat and the alkali halide stimulable phosphor was evaporated by the resistance heating method to deposit a stimulable phosphor layer to a layer thickness of 300 μm on the aluminum sheet. Subsequently, the above aluminum sheet was heated to 300° C. in vacuum, and then quenched to obtain a radiation image storage panel A of the present invention.

After the thus prepared radiation image storage panel A of the present invention was irradiated with 10 mR of X-ray at a tube voltage of 80 KVp, stimulation excitation was effected with He-Ne laser beam (633 nm) and the stimulated emission radiated from the stimulable phosphor layer was photoelectrically converted by an optical detector (photomultiplier tube). The signal obtained was reproduced by an image reproducing device to be recorded on a silver salt film. From the size of the signal, sensitivity of the radiation image storage panel A to X-ray was examined, and from the image obtained, modulation transmission function (MTF) and graininess of the image were examined to give the results as shown in Table 1.

In Table 1, sensitivity to X-ray is shown as the relative value to that of the radiation image storage panel A which is 100. Modulation transmission function (MTF) is the value at the time of 2 cycle/mm of space frequency, and graininess is represented in terms of (O, Δ, ×) for (good, common, bad), respectively.

EXAMPLE 2

On the surface of an aluminum sheet with a thickness of 500 μm as the support, a metal mesh knitted with a metal wire of 50 μm in diameter was pressure coated, and the composite was set in a sputtering device. Next, an alkali halide stimulable phosphor (0.95 RbBr.0.05 CsF: 0.005 Tl) was set in the sputtering device, followed by evacuation to a vacuum degree of $1\times10^{-6}$ Torr. Sputtering was performed, while introducing Ar gas as the sputter gas, to effect deposition until the layer thickness of the metal mesh became 300 μm to obtain a radiation image storage panel B of the present invvention.

The radiation image storage pasnel thus obtained was evaluated similarly as in Example 1 to obtain the results which are also listed in Table 1.

TABLE 1

| Panel | Layer thickness (μm) | X-ray sensitivity | Graininess | Sharpness (%) |
|---|---|---|---|---|
| Panel A (This invention) | 300 | 100 | O | 41 |
| Panel B (This invention) | 300 | 89 | O | 39 |
| Panel a (Control) | 300 | 50 | Δ | 30 |

As apparently seen from Table 1, the radiation image storage panels A and B of the present invention are higher in sensitivity by about two-fold and more excellent in graininess of the image, as compared with the radiation image storage panel a of Control. This is because the radiation image storage panel of the present invention contains no binder and is better in absorption of X-ray with higher filling ratio of the stimulable phosphor than the Control panel.

Also, the radiation image storage panels A and B of the present invention are sharper than the radiation image storage panel a of Control in spite of higher X-ray sensitivity. This is because the stimulable phosphor layer of the radiation image storage panel of the present invention has a block structure in shape of fine pillars, whereby scattering of He-Ne laser which is the stimulating excitation light within the stimulable phosphor can be reduced.

EXAMPLE 3

An aluminum plate with a thickness of 500 μm was coated with a photoresist resin, subjected to pattern exposure and development to form a minute concavo-convex pattern as shown in FIG. 2(*d*) to provide a support.

The minute concavo-convex pattern had a size of 80 μm ×80 μm with a thickness of 40 μm.

Next, the support was set in a vapor deposition vessel, an alkali halide stimulable phosphor (0.9 RbBr·0.1 CsF: 0.01 T1) was placed in a tungsten boat for resistance heating, set on the electrodes for resistance heating and subseuently the deposition vessel was evacuated to a vacuum degree of $2\times10^{-6}$ Torr.

Next, current was passed through the tungsten boat and the alkali halide stimulable phosphor was evaporated by the resistance heating method to deposit a stimulable phosphor layer to a layer thickness of 300 μm on the above support to obtain a radiation image storage panel C of the present invention.

After the thus prepared radiation image storage panel C of the present invention was irradiated with 10 mR of X-ray at a tube voltage of 80 KVp, stimulation excitation was effected with He-Ne laser beam (633 nm) and the stimulated emission radiated from the stimulable phosphor layer was photoelectrically converted by an optical detector (photomultiplier tube). The signal obtained was reproduced by an image reproducing device to be recorded on a silver salt film. From the size of the signal, sensitivity of the radiation image storage panel C to X-ray was examined, and from the image obtained, modulation transmission function (MTF) and graininess of the image were examined to give the results as shown in Table 2.

In Table 1, sensitivity to X-ray is shown as the relative value to that of the radiation image storage panel C which is 100. Modulation transmission function (MTF) is the value at the time of 2 cycle/mm of space frequency, and graininess is represented in terms of (O,Δ,×) for (good, common, bad), respectively.

EXAMPLE 4

An aluminum plate with a thickness of 500 μm was coated with a nylon type photosensitive resin to a thickness of 130 μm, subjected to pattern exposure and development to form a fine concavo-convex pattern as shown in FIG. 2(*a*) to provide a support. The above fine concavo-convex pattern has a size of concavity of 110 μm×110 μm and a width of convexity of 20 μm. Next, after a stimulable phosphor layer was provided in the same manner as in Example 3, the upper surface of the stimulable phosphor layer was polished to have the concavities on the support surface exposed to obtain a radiation image storage panel D of the present invention.

The radiation image storage panel D of the present invention thus prepared was evaluated similarly as in Example 3 to give the results which are also shown in Table 2.

EXAMPLE 5

A radiation image storage panel E of the present invention was prepared in the same manner as in Example 3, except for using as the support a black polyethyleneterephthalate film of which the surface is subjected to embossing working to form a fine concavo-convex pattern. The radiation image storage panel E of the present invention thus prepared was evaluated similarly as in Example 3 to give the results which are also shown in Table 2.

COMPARATIVE EXAMPLE 2

Eight parts by weight of an alkali halide stimulable phosphor (0.9 RbBr·0.1 CsF:0.01 T1), one part by weight of a polyvinyl butyral resin and five parts by weight of a solvent (cyclohexanone) were mixed and dispersed to prepare a coating liquid for stimulable phosphor. Then, the coating liquid was applied uniformly on a black polyethylene terephthalate film with a thickness of 300 μm as the support placed horizontally, followed by natural drying, to obtain a stimulable phosphor layer with a thickness of 300 μm.

The radiation image storage panel b for comparative purpose thus obtained was evaluated similarly as in Example 3 to obtain the results which are also listed in Table 2.

COMPARATIVE EXAMPLE 3

A radiation image storage panel c was prepared in the same manner as in Comparative Example 2 except for masking the layer thickness of the stimulable phosphor layer 130 μm.

The radiation image storage panel c for comparative purpose thus obtained was evaluated similarly as in Example 3 to obtain the results which are also listed in Table 2.

TABLE 2

| Panel | Layer thickness (μm) | X-ray sensitivity | Graininess | Sharpness (%) |
|---|---|---|---|---|
| Panel C (This invention) | 300 | 100 | O | 41 |
| Panel D | 130 | 43 | Δ | 49 |

TABLE 2-continued

| Panel | Layer thickness (μm) | X-ray sensitivity | Graininess | Sharpness (%) |
|---|---|---|---|---|
| (This invention) | | | | |
| Panel E (This invention) | 300 | 10 | O | 40 |
| Panel b (Control) | 300 | 56 | Δ | 31 |
| Panel c (Control) | 130 | 21 | X | 44 |

As apparently seen from Table 2, the radiation image storage panels C to E of the present invention are higher in sensitivity by about two-fold and more excellent in graininess of the image, as compared with the radiation image storage panels b and c of Control. This is because the radiation image storage panel of the present invention contains no binder and better in absorption of X-ray with higher filling ratio of the stimulable phosphor than the Control panel.

Also, the radiation image storage panels C to E of the present invention were more excellent in sharpness than the radiation image storage panels b and c of Control in spite of higher X-ray sensitivity. This is because the stimulable phosphor layer of the radiation image storage panel of the present invention has a block structure in shape of fine pillars, whereby scattering of He-Ne laser which is the stimulating excitation light within the stimulable phosphor can be suppressed and reduced.

EXAMPLE 6

An aluminum plate with a thickness of 500 μm was subjected to the anodic oxidation treatment, the sealing treatment and the heating treatment to form a support with a surface structure like a large number of tiles lie as being separated from each other by fine gaps, which was set in a vapor deposition vessel. The above tiles had an average size of 60 μm.

Next, an alkali halide stimulable phosphor (0.9 RbBr·0.1 CsF:0.01 T1) was placed in a tungsten boat for resistance heating, set on the electrodes for resistance heating and subseuently the deposition vessel was evacuated to a vacuum degree of $2\times10^{-6}$ Torr.

Next, current was passed through the tungsten boat and the alkali halide stimulable phosphor was evaporated by the resistance heating method to deposite a stimulable phosphor layer to a layer thickness of 300 μm to obtain a radiation image storage panel F of the present invention.

After the thus prepared radiation image storage panel F of the present invention was irradiated with 10 mR of X-ray at a tube voltage of 80 KVp, stimulation excitation was effected with He-Ne laser beam (633 nm) and the stimulated emission radiated from the stimulable phosphor layer was photoelectrically converted by an optical detector (photomultiplier tube). The signal obtained was reproduced by an image reproducging device to be recorded on a silver salt film. From the size of the signal, sensitivity of the radiation image storage panel F to X-ray was examined, and from the image obtained, modulation transmission function (MTF) and graininess of the image were examined to give the results as shown in Table 3.

Table 3, sensitivity to X-ray is shown as the relative value to that of the radiation image storage panel F which is 100. Modulation transmission function (MTF) is the value at the time of 2 cycle/mm of space frequency, and graininess is represented in terms of (O,Δ,×) for (good, common, bad), respectively.

EXAMPLE 7

A radiation image storage panel G of the present invention was obtained in the same manner as in Example 6 except for changing the layer thickness of the stimulable phosphor layer to 150 μm.

The radiation image storage panel G of the present invention thus prepared was evaluated similarly as in Example 6 to obtain the results which are also listed in Table 3.

EXAMPLE 8

A radiation image storage panel H of the present invention was obtained in the same manner as in Example 6 except for changing the average size of the tile of the support to 120 μm.

The radiation image storage panel H of the present invention thus prepared was evaluated similarly as in Example 6 to obtain the results which are also listed in Table 3.

EXAMPLE 9

In Example 6, after an aluminum plate with a thickness of 500 μm was subjected to the anodic oxidation treatment, the sealing treatment and the heating treatment to form a support with a surface structure like a large number of tiles lie as being separated from each other by fine gaps, a metallic aluminum was vacuum deposited to a thickness of 0.1 μm, following otherwise the same procedure as in Example 6, to obtain a radiation image storage panel I of the present invention. By vapor depositing thus thinly the metallic aluminum, the tile-shaped surface of the aluminum support becomes blackened.

The radiation image storage panel I of the present invention thus prepared was evaluated similarly as in Example 6 to obtain the results which are also listed in Table 3.

EXAMPLE 10

In Example 6, after an aluminum plate with a thickness of 500 μm was subjected to the anodic oxidation treatment, the sealing treatment and the heating treatment to form a support with a surface structure like a large number of tiles lie as being separated from each other by fine gaps, a metallic aluminum was vacuum deposited to a thickness of 1 μm, following otherwise the same procedure as in Example 6, to obtain a radiation image storage panel J of the present invention. By vapor depositing thus thickly the metallic aluminum, the reflectance of tile-shaped surface of the aluminum support was improved by about 20%.

The radiation image storage panel J of the present invention thus prepared was evaluated similarly as in Example 6 to obtain the results which are also listed in Table 3.

COMPARATIVE EXAMPLE 4

Eight parts by weight of an alkali halide stimulable phosphor (0.9 RbBr·0.1 CsF:0.01 T1), one part by weight of a polyvinyl butyral resin and five parts by weight of a solvent (cyclohexanone) were mixed and dispersed to prepare a coating liquid for stimulable phosphor. Then, the coating liquid was applied uniformly on a black polyethylene terephthalate film with a thickness of 300 μm as the support placed horizontally, followed by natural drying, to obtain a stimulable phosphor layer with a thickness of 300 μm.

The radiation image storage panel d for comparative purpose was evaluated similarly as in Example 6 to obtain the results which are also listed in Table 3.

COMPARATIVE EXAMPLE 5

Comparative Example 4 was repeated except that the layer thickness of the stimulable phosphor layer was changed to 150 μm to obtain a radiation image storage panel e for comparative purpose.

The radiation image storage panel for comparative purpose thus obtained was evaluated in the same manner as in Example 6 to obtain the results which are also listed in Table 3.

TABLE 3

| Panel | Layer thickness (μm) | X-ray sensitivity | Graininess | Sharpness (%) |
|---|---|---|---|---|
| Panel F (This invention) | 300 | 100 | O | 53 |
| Panel G (This invention) | 150 | 52 | Δ | 63 |
| Panel H (This invention) | 300 | 104 | O | 47 |
| Panel I (This invention) | 300 | 90 | O | 57 |
| Panel J (This invention) | 300 | 116 | O | 45 |
| Panel d (Control) | 300 | 55 | Δ | 30 |
| Panel e (Control) | 150 | 28 | X | 40 |

As apparently seen from Table 3, the radiation image storage panels F to J of the present invention are higher in sensitivity by about two-fold and more excellent in graininess of the image, as compared with the radiation image storage panels d and e of Control having corresponding thicknesses. This is because the radiation image storage panel of the present invention contains no binder and better in absorption of X-ray with higher filling ratio of the stimulable phosphor than the Control panel.

Also, the radiation image storage panels F to J of the present invention were more excellent in sharpness than the radiation image storage panels d and e of Control in spite of higher X-ray sensitivity.

EXAMPLE 11

An aluminum plate with a thickness of 500 μm was subjected to the anodic oxidation treatment, the sealing treatment and the heating treatment according to the methods as described above to form a support with a surface structure like a large number of tiles lie as being separated from each other by fine gaps, which was set in a vapor deposition vessel.

The above tiles had an average size of 60 μm and a thickness d of 10 μm. Subsequently, by application of nickel plating on the aluminum plate applied with the above treatment, a fine-strings net surrounding the above fine tiles to partition them from each other was formed. The fine-strings net had a height h of 16 μm.

Next, an alkali halide stimulable phosphor (0.9 RbBr·0.1 CsF:0.01 T1) was placed in a tungsten boat for resistance heating, set on the electrodes for resistance heating and subsequently the deposition vessel was evacuated to a vacuum degree of $2\times10^{-6}$ Torr.

Next, current was passed through the tungsten boat and the alkali halide stimulable phosphor was evaporated by the resistance heating method to deposit a stimulable phosphor layer to a layer thickness of 300 μm to obtain a radiation image storage panel K of the present invention.

After the thus prepared radiation image storage panel K of the present invention was irradiated with 10 mR of X-ray at a tube voltage of 80 KVp, stimulation excitation was effected with He-Ne laser beam (633 nm) and the stimulated emission radiated from the stimulable phosphor layer was photoelectrically converted by an optical detector (photomultiplier tube). The signal obtained was reproduced by an image reproducging device to be recorded on a silver salt film. From the size of the signal, sensitivity of the radiation image storage panel K to X-ray was examined, and from the image obtained, modulation transmission function (MTF) and graininess of the image were examined to give the results as shown in Table 4.

In Table 4, sensitivity to X-ray is shown as the relative value to that of the radiation image storage panel K which is 100. Modulation transmission function (MTF) is the value at the time of 2 cycle/mm of space frequency, and graininess is represented in terms of (O,Δ,×) for (good, common, bad), respectively.

EXAMPLE 12

A radiation image storage panel L of the present invention was obtained in the same manner as in Example 11 except for changing the layer thickness of the stimulable phosphor layer to 150 μm.

The radiation image storage panel L of the present invention thus prepared was evasluated similarly as in Example 11 to obtain the results which are also listed in Table 4.

EXAMPLE 13

A radiation image storage panel M of the present invention was obtained in the same manner as in Example 11 except for changing the average size of the tile of the support to 115 μm.

The radiation image storage panel M of the present invention thus prepared was evaluated similarly as in Example 11 to obtain the results which are also listed in Table 4.

EXAMPLE 14

A radiation image storage pattern N of the present invention was obtained in the same manner as in Example 11 except for changing the height h of the fine-strings net of the support to 11 μm.

The radiation image storage panel N of the present invention thus prepared was evaluated similarly as in Example 11 to obtain the results which are also listed in Table 4.

EXAMPLE 15

In Example 11, after an aluminum plate with a thickness of 500 μm was subjected to the treatment according to the same method as in Example 11 to form a fine-strings net surrounding the fine tiles on the aluminum surface to separate them from each other, a metallic aluminum was vacuum deposited to a thickness of 0.1 μm, following otherwise the same procedure as in Example 11, to obtain a radiation image storage panel O of the present invention. By vapor depositing thus thinly the metallic aluminum, the tile-shaped surface of the aluminum support becomes blackened.

The radiation image storage panel O of the present invention thus prepared was evaluated similarly as in Example 11 to obtain the results which are also listed in Table 4.

EXAMPLE 16

In Example 11, after an aluminum plate with a thickness of 500 μm was subjected to the treatment according to the same method as in Example 11 to form a fine-strings net surrounding the fine tiles on the aluminum surface to separate them from each other, a metallic aluminum was vacuum deposited to a thickness of 1 μm, following otherwise the same procedure as in Example 11, to obtain a radiation image storage panel P of the present invention. By vapor depositing thus thickly the metallic aluminum, the reflectance of tile-shaped surface of the aluminum support was improved by about 20%.

The radiation image storage panel P of the present invention thus prepared was evaluated similarly as in Example 11 to obtain the results which are also listed in Table 4.

EXAMPLE 17

In Example 11, except for using as the support an aluminum plate with a thickness of 500 μm which was coated with a photoresin resin, baked with a a pattern of fine tiles, developed and further dried to form fine tiles, the same procedure was followed to obtain a radiation image storage panel Q of the present invention.

The fine tile was square of 100 μm per one side and had a thickness d of 10 μm. The width of the gap was 10 μm.

The radiation image storage panel Q of the present invention thus prepared was evaluated similarly as in Example 11 to obtain the results which are also listed in Table 4.

COMPARATIVE EXAMPLE 6

Eight parts by weight of an alkali halide stimulable phosphor (0.9 RbBr·0.1 CsF:0.01 T1), one part by weight of a polyvinyl butyral resin and five parts by weight of a solvent (cyclohexanone) were mixed and dispersed to prepare a coating liquid for stimulable phosphor. Then, the coating liquid was applied uniformly on a black polyethylene terephthalate film with a thickness of 300 μm as the support placed horizontally, followed by natural drying, to obtain a stimulable phosphor layer with a thickness of 300 μm.

The radiation image storage panel f for comparative purpose was evaluated similarly as in Example 11 to obtain the results which are also listed in Table 4.

COMPARATIVE EXAMPLE 7

Comparative Example 6 was repeated except that the layer thickness of the stimulable phosphor layer was changed to 150 μm to obtain a radiation image storage panel g for comparative purpose.

The radiation image storage panel for comparative purpose thus obtained was evaluated in the same manner as in Example 11 to obtain the results which are also listed in Table 4.

TABLE 4

| Panel | Layer thickness (μm) | X-ray sensitivity | Graininess | Sharpness (%) |
|---|---|---|---|---|
| Panel K (This invention) | 300 | 100 | O | 57 |
| Panel L (This invention) | 150 | 55 | Δ | 68 |
| Panel M (This invention) | 300 | 106 | O | 49 |
| Panel N (This invention) | 300 | 110 | O | 54 |
| Panel O (This invention) | 300 | 90 | O | 60 |
| Panel P (This invention) | 300 | 115 | O | 48 |
| Panel Q (This invention) | 300 | 86 | O | 46 |
| Panel f (Control) | 300 | 56 | Δ | 31 |
| Panel g (Control) | 150 | 27 | X | 42 |

As apparently seen from Table 4, the radiation image storage panels K to Q of the present invention are higher in sensitivity by about two-fold and more excellent in graininess of the image, as compared with the radiation image storage panels f and g of Control having corresponding thicknesses of stimulable phosphor layers. This is because the radiation image storage panel of the present invention contains no binder and better in absorption of X-ray with higher filling ratio of the stimulable phosphor than the Control panel.

Also, the radiation image storage panels K to Q of the present invention were more excellent in sharpness than the radiation image storage panels f and g of Control in spite of higher X-ray sensitivity.

EXAMPLE 18

An aluminum plate with a thickness of 500 μm was subjected to the anodic oxidation treatment, the sealing treatment and the heating treatment according to the methods as described above to form a support with a surface structure like a large number of tiles lie as being separated from each other by fine gaps, which was set in a vapor deposition vessel. The above tiles had an average size of 65 μm.

Next, an alkali halide stimulable phosphor (0.9 RbBr·0.1 CsF:0.01 T1) was placed in a tungsten boat for resistance heating, set on the electrodes for resistance heating and subsequently the deposition vessel was evacuated to a vacuum degree of $2\times10^{-6}$ Torr.

Next, current was passed through the tungsten boat and the alkali halide stimulable phosphor was evaporated by the resistance heating method to deposit a stimulable phosphor layer to a layer thickness of 300 μm.

Next, the panel was taken out from the vapor deposition vessel, heated to 300° C. in a nitrogen atmosphere, maintained under this state for 10 minutes, followed by removal of the heating furnace simultaneously with quencying by increasing the flow rate of nitrogen to thereby apply a shock and obtain a radiation image storage panel R of the present invention.

After the thus prepared radiation image storage panel R of the present invention was irradiated with 10 mR of X-ray at a tube volatge of 80 KVp, stimulation excitation was effected with He-Ne laser beam (633 nm) and the stimulated emission radiated from the stimulable phosphor layer was photoelectrically converted by an optical detector (photomultiplier tube). The signal obtained was reproduced by an image reproducing device to be recorded on a silver salt film. From the size of the signal, sensitivity of the radiation image storage panel R to X-ray was examined, and from the image obtained, modulation transmission function (MTF) and graininess of the image were examined to give the results as shown in Table 5.

In Table 5, sensitivity to X-ray is shown as the relative value to that of the radiation image storage panel R which is 100. Modulation transmission function (MTF) is the value at the time of 2 cycle/mm of space frequency, and graininess is represented in terms of (O,Δ,×) for (good, common, bad), respectively.

EXAMPLE 19

A radiation image storage panel S of the present invention was obtained in the same manner as in Example 18 except for applying the shock treatment by heating the panel to 150° C. in a nitrogen atmosphere, maintaining under this state for 10 minutes and then quenching the panel by dipping it in methanol.

The radiation image storage panel S of the present invention thus prepared was evaluated similarly as in Example 18 to obtain the results which are also listed in Table 5.

EXAMPLE 20

A radiation image storage panel T of the present invention was obtained in the same manner as in Example 18 except for applying the shock treatment by adsorbing nitrogen gas onto the stimulable phosphor layer of the panel, then heating the panel in vacuum to 300° C., followed by quenching.

The radiation image storage panel T of the present invention thus prepared was evaluated similarly as in Example 18 to obtain the results which are also listed in Table 5.

EXAMPLE 21

In Example 18, after an aluminum plate with a thickness of 500 μm was subjected to the anodic oxidation treatment, the sealing treatment and the heating treatment according to the methods as described above to form a surface structure like a large number of tiles lie as being separated from each other by fine gaps and subsequently the aluminum plate applied with the above treatments was applied with nickel plating to form a fine-strings net surrounding the fine tiles on the aluminum surface to separate them from each other, following otherwise the same procedure as in Example 18, a radiation image storage panel U of the present invention was obtained.

In the above support, the fine tiles had an average size of 62 μm and a thickness d of 10 μm, while the height of the fine-strings net had a height of 16 μm.

The radiation image storage panel U of the present invention thus prepared was evaluated similarly as in Example 18 to obtain the results which are also listed in Table 5.

COMPARATIVE EXAMPLE 8

Eight parts by weight of an alkali halide stimulable phosphor (0.9 RbBr·0.1 CsF:0.01 Tl), one part by weight of a polyvinyl butyral resin and five parts by weight of a solvent (cyclohexanone) were mixed and dispersed to prepare a coating liquid for stimulable phosphor. Then, the coating liquid was applied uniformly on a black polyethylene terephthalate film with a thickness of 300 μm as the support placed horizontally, followed by natural drying, to obtain a stimulable phosphor layer with a thickness of 300 μm.

The radiation image storage panel h for comparative purpose was evaluated similarly as in Example 18 to obtain the results which are also listed in Table 5.

TABLE 5

| Panel | Layer thickness (μm) | X-ray sensitivity | Graininess | Sharpness (%) |
|---|---|---|---|---|
| Panel R (This invention) | 300 | 100 | O | 59 |
| Panel S (This invention) | 300 | 100 | O | 58 |
| Panel T (This invention) | 300 | 98 | O | 55 |
| Panel U (This invention) | 300 | 97 | O | 61 |
| Panel h (Control) | 300 | 54 | Δ | 31 |

As apparently seen from Table 5, the radiation image storage panels R to U of the present invention are higher in sensitivity by about two-fold and more excellent in graininess of the image, as compared with the radiation image storage panel h of Control having corresponding thickness of stimulable phosphor layer. This is because the radiation image storage panel of the present invention contains no binder and better in absorption of X-ray with higher filling ratio of the stimulable phosphor than the Control panel.

Also, the radiation image storage panels R to U of the present invention were more excellent in sharpness than the radiation image storage panel h of Control in spite of higher X-ray sensitivity.

As described above, according to the present invention, since the stimulable phosphor layer has a block structure shaped in fine pillars, scattering of the stimulation exciting light within the stimulable phosphor layer can be markedly reduced, whereby it is possible to improve sharpness of the image.

Also, according to the present invention, since lowering in sharpness of the image due to increase of the stimulable phosphor layer is little, radiation sensitivity and graininess of the image can be improved by enlargement of the stimulable phosphor layer without lowering sharpness of the image.

Further, according to the present invention, the radiation image storage panel can be produced stably at low cost.

The present invention is extremely great in its effects and useful in industrial applications.

We claim:

1. A radiation image storage panel having a stimulable phosphor layer on a support, wherein said stimulable phosphor layer has a fine pillar-shaped block structure, with pillar-shaped blocks in said structure being separated from each other by gaps having widths of 0.01 to 20 μm.

2. A radiation image storage panel according to claim 1, wherein pillar-shaped blocks in said structure extend perpendicularly to said support.

3. A radiation image storage panel according to claim 1, wherein said panel comprises the support, the surface of which has a concavo-convex pattern.

4. A radiation image storage panel according to claim 3, wherein said surface comprises a large number of fine tiles separated from each other by a fine space.

5. A radiation image storage panel according to claim 4, wherein said surface is composed of aluminum oxide.

6. A radiation image storage panel according to claim 4, wherein said panel comprises a net with fine strings to surround said structure.

7. A radiation image storage panel according to claim 1, wherein said panel comprises a support having a fine mesh pressed thereon.

8. A radiation image storage panel according to claim 1, wherein said stimulable phosphor layer has a thickness in the range of 10 μm to 1000 μm.

9. A radiation image storage panel according to claim 1, wherein the diameter of each of said fine pillar-shaped blocks is in the range of 1 μm to 400 μm.

10. A radiation image storage panel according to claim 1, wherein said support has particles of impurities on the surface thereof.

11. A radiation image storage panel according to claim 1, wherein said stimulable phosphor layer has crevasses developed from a surface thereof.

* * * * *